United States Patent
Yamada

(10) Patent No.: US 9,610,891 B2
(45) Date of Patent: Apr. 4, 2017

(54) IN-VEHICLE ILLUMINATING APPARATUS, IMAGE PROCESSING APPARATUS, AND IMAGE DISPLAYING SYSTEM

(75) Inventor: Masahiro Yamada, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 703 days.

(21) Appl. No.: 13/509,900

(22) PCT Filed: Oct. 26, 2010

(86) PCT No.: PCT/JP2010/068930
§ 371 (c)(1),
(2), (4) Date: May 15, 2012

(87) PCT Pub. No.: WO2011/058875
PCT Pub. Date: May 19, 2011

(65) Prior Publication Data
US 2012/0229645 A1 Sep. 13, 2012

(30) Foreign Application Priority Data
Nov. 16, 2009 (JP) .................................. 2009-260699

(51) Int. Cl.
*H04N 7/18* (2006.01)
*B60Q 1/26* (2006.01)
(Continued)

(52) U.S. Cl.
CPC .............. *B60Q 1/2665* (2013.01); *B60Q 1/32* (2013.01); *B60R 1/00* (2013.01);
(Continued)

(58) Field of Classification Search
CPC ............ B60Q 1/2665; B60Q 1/32; B60R 1/00
(Continued)

(56) References Cited

U.S. PATENT DOCUMENTS 6,276,821 B1 * 8/2001 Pastrick et al. ............... 362/494
2002/0118282 A1 8/2002 Nakamura
(Continued)

FOREIGN PATENT DOCUMENTS

JP B2-3286306 5/2002
JP A-2002-240629 8/2002
(Continued)

OTHER PUBLICATIONS

International Search Report issued in International Patent Application No. PCT/JP2010/068930 dated Jan. 25, 2011.
(Continued)

*Primary Examiner* — Gims Philippe
*Assistant Examiner* — Jill Sechser
(74) *Attorney, Agent, or Firm* — Oliff PLC

(57) ABSTRACT

A plurality of light sources to assist in image capturing is attached to a vehicle at low cost and simplicity. Three light sources that illuminate a side area in the same direction of the vehicle are fixed to and accommodated in the same housing in a state where light axes of the light sources are directed to different directions from each other. Through this, the three light sources are integrated into a side camera unit by the housing. Accordingly, by attaching the side camera unit only, the light sources can be attached to the vehicle at a time. As a result, the light sources for widely illuminating the side area of the vehicle can be mounted on the vehicle at low cost and simplicity.

13 Claims, 22 Drawing Sheets

(51) Int. Cl.
*B60Q 1/32* (2006.01)
*B60R 1/00* (2006.01)

(52) U.S. Cl.
CPC ... *B60R 2300/103* (2013.01); *B60R 2300/105* (2013.01); *B60R 2300/303* (2013.01); *B60R 2300/607* (2013.01); *B60R 2300/806* (2013.01); *B60R 2300/8093* (2013.01)

(58) Field of Classification Search
USPC .......................................................... 348/148
See application file for complete search history.

(56) References Cited

U.S. PATENT DOCUMENTS

| | | | | |
|---|---|---|---|---|
| 2004/0075544 | A1* | 4/2004 | Janssen | G08G 1/167 340/435 |
| 2006/0091813 | A1* | 5/2006 | Stam | B60Q 1/085 315/82 |
| 2007/0173983 | A1* | 7/2007 | Takahashi et al. | 701/1 |
| 2009/0309710 | A1* | 12/2009 | Kakinami | 340/435 |

FOREIGN PATENT DOCUMENTS

| | | |
|---|---|---|
| JP | A-2004-189060 | 7/2004 |
| JP | A-2005-55318 | 3/2005 |
| JP | A-2006-324222 | 11/2006 |
| JP | A-2008-59159 | 3/2008 |
| JP | A-2009-239754 | 10/2009 |

OTHER PUBLICATIONS

Office Action issued in Chinese Patent Application No. 201080051841.5 mailed Jan. 2, 2014 (with translation).

Jun. 12, 2012 English Translation of International Preliminary Report on Patentability issued in International Patent Application No. PCT/JP2010/068930.

* cited by examiner

FIG. 16

| DISPLAY MODE | FRONT LIGHT SOURCE | CENTER LIGHT SOURCE | REAR LIGHT SOURCE |
|---|---|---|---|
| SURROUNDING CONFIRMATION MODE | ON | ON | ON |
| FRONT MODE - DRIVING DOWNWARD VIEW MODE | ON | ON | ON |
| FRONT MODE - VEHICLE CONFIRMATION MODE | ON | ON | OFF |
| FRONT MODE - SIDE CAMERA MODE | OFF | ON | OFF |
| BACK MODE - PARKING DOWNWARD VIEW MODE | ON | ON | ON |
| BACK MODE - DOOR MIRROR MODE | OFF | ON | OFF |

IN-VEHICLE ILLUMINATING APPARATUS, IMAGE PROCESSING APPARATUS, AND IMAGE DISPLAYING SYSTEM

TECHNICAL FIELD

The present invention relates to a technology to perform an illumination to assist in capturing images of the periphery of a vehicle.

BACKGROUND ART

In the related art, an image displaying system has been known, which is installed on a vehicle such as an automobile to display images obtained by capturing the images of the periphery of the vehicle through vehicle cameras on a display provided in a cabin. By using this image displaying system, a driver can grasp the state of the periphery of the vehicle almost in real time.

For example, an outer area of a front fender that is the opposite side to a driver's seat is liable to be in the dead angle, and thus it is difficult for a driver to grasp the clearance between a vehicle body and an obstacle. By contrast, if the image displaying system is used, images showing the outer area of the front fender are acquired by capturing the images through vehicle cameras, and the acquired images are displayed on the display provided in the cabin. Through this, even in the case of moving toward the roadside, the driver can easily confirm the clearance between the vehicle body that is on the opposite side to the driver's seat and the obstacle.

In such an image displaying system, however, in the case where the surrounding environment is dark such as nighttime, sufficient amount of exposure may not be obtained at the time of image capturing, and in some cases, sufficient brightness may not be ensured with respect to the images showing the periphery of the vehicle. Due to this, it has also been proposed that the necessary brightness of images is ensured by illuminating an area of which images are to be captured through emission of auxiliary light to assist in capturing the images in the case where the surrounding environment is relatively dark (for example, see Patent Literature 1).

PRIOR ART DOCUMENT

Patent Document

Patent Document 1: Japanese Patent Application Publication No. 2004-189060
Patent Document 2: Japanese Patent No. 3286306

SUMMARY OF INVENTION

Problems to be Solved by Invention

Recently, an image displaying system has been proposed, which generates and displays, on a display, a synthetic image showing the appearance of the periphery of a vehicle viewed from a virtual viewpoint, such as directly above or rear of the vehicle, using a plurality of images obtained by capturing the image of the periphery of the vehicle through a plurality of vehicle cameras (for example, see Patent Literature 2). In this image displaying system, it is also possible to display an image showing the whole of the periphery of the vehicle on the display.

In the case of using such an image displaying system, it is preferable to illuminate the periphery of the vehicle when the surrounding environment is relatively dark. In this case, it is possible to illuminate a front side and a rear side of the vehicle with lightening devices for driving (headlights, tail lamps, and the like) with which the vehicle is equipped as standard. By contrast, it is difficult for the illumination performed by the standard lightening devices for driving to reach a side area of the vehicle, and thus it is necessary to assist with light illumination over a relatively wide range from the front to the rear of the vehicle.

A range that can be illuminated by one light source is limited, and in order to illuminate over the whole side area from the front to the rear of the vehicle, it is necessary to share the illumination through a plurality of light sources. In this case, it is considered, for example, to arrange the respective light sources in a plurality of positions (for example, a front end portion, a center portion, and a rear end portion of the vehicle), from the front to the rear of the vehicle, on the side surface of the vehicle.

However, if the light sources are arranged in the plurality of positions on the side surface of the vehicle, it is necessary to arrange power supply lines or control lines up to the respective positions of the plurality of light sources, and thus large and complex work is required to attach the plurality of light sources to the vehicle. Because of this, the installation cost of the plurality of light sources is increased, and further, the cost of mounting the image displaying system is increased. In the case of providing the image displaying system as a retrofit option for the vehicle, simple attachment to the vehicle at low cost becomes the necessary condition, and there is a need for solution to the problem like this.

Accordingly, the present invention has been made in consideration of the above-described situations, and the subject to be solved by the invention is to provide a technology that enables simple attachment of a plurality of light sources to assist in image capturing to the vehicle at low cost.

Means for Solving Problems

The subject to be solved by the invention is achieved by the following configurations.

(1) An in-vehicle illuminating apparatus that performs an illumination to assist in capturing a plurality of images of a periphery of a vehicle through a plurality of cameras of an image generating apparatus that generates a synthetic image viewed from a virtual viewpoint based on the images, the in-vehicle illuminating apparatus including a plurality of light sources that illuminates a side area of the vehicle; and a housing in which the light sources are fixed and accommodated in a state where light axes of the light sources are directed to different directions from each other.

Further, the in-vehicle illuminating apparatus, wherein the light sources include a first light source that mainly illuminates a front area disposed at a front side of the vehicle in the side area; a second light source that mainly illuminates a rear area disposed at a rear side of the vehicle in the side area; and a third light source that mainly illuminates an area disposed between the front area and the rear area.

(2) The in-vehicle illuminating apparatus as described in (1), wherein a direction of a light axis of the first light source and a direction of a light axis of the second light source are symmetrical with respect to a direction of a light axis of the third light source.

(3) The in-vehicle illuminating apparatus as described in (1) or (2), further including light source driving means for reducing an amount of light of the third light source to less than an amount of light of the first light source and an amount of light of the second light source.

(4) The in-vehicle illuminating apparatus as described in any one of (1) to (3), wherein among the cameras, a camera that captures an image of the side area of the vehicle is accommodated in the housing.

(5) The in-vehicle illuminating apparatus as described in any one of (1) to (4), further including control means that selectively activates and deactivates the light sources.

(6) The in-vehicle illuminating apparatus as described in (5), wherein the image generating apparatus outputs an image showing at least a partial area of the periphery of the vehicle to a display apparatus to allow the display apparatus to display the image, wherein the control means selects one or more light sources to be activated among the light sources in accordance with an area shown in the image to be displayed on the display apparatus.

(7) The in-vehicle illuminating apparatus as described in (5), further including input means for inputting a signal indicative of an operating state of a lightening device for driving, used in driving of the vehicle, wherein the control means selects one or more light sources to be activated among the light sources in accordance with the operating state of the lightening device.

(8) The in-vehicle illuminating apparatus as described in (5), further including input means for inputting a direction indication in which a driver of the vehicle intends to turn, wherein the housing is respectively provided at left side and right side of the vehicle, and wherein when the direction indication is input, the control means selects one or more light sources to be activated among the light sources accommodated in the housing disposed at a side indicated by the direction indication.

(9) An image processing apparatus to be mounted on a vehicle, including an image generating apparatus that generates a synthetic image viewed from a virtual viewpoint based on a plurality of images of a periphery of the vehicle, captured by a plurality of cameras; and the in-vehicle illuminating apparatus as described in any one of (1) to (8), that performs the illumination to assist in capturing the images through the cameras of the image generating apparatus.

(10) An image displaying system to be mounted on a vehicle, including the image processing apparatus as described in (9); and a display apparatus that displays an image showing the periphery of the vehicle, that is output from the image processing apparatus.

Advantageous Effects of Invention

According to the configuration of (1) or (10), the light sources that illuminate the side area of the vehicle are accommodated in the housing in a state where the light axes of the light sources are directed to different directions from each other. Through this, the light sources are integrated by the housing, and the light sources for widely illuminating the side area of the vehicle can be mounted on the vehicle at low cost and simplicity.

In particular, according to the configuration of (1), the side area of the vehicle can be illuminated over a range from the front to the rear of the vehicle.

In particular, according to the configuration of (2), since the integrated light sources can be combined to both the left and right sides of the vehicle, the versatility is improved to reduce the cost.

In particular, according to the configuration of (3), by reducing the amount of light of the third light source to less than the amount of light of the first light source and the amount of light of the second light source, the side area of the vehicle can be substantially uniformly illuminated over a range from the front to the rear of the vehicle.

In particular, according to the configuration of (4), since the camera and the light sources to assist in image capturing through the camera are integrated by the housing, the camera and the light sources can be attached to the vehicle collectively and easily.

In particular, according to the configuration of (5), since the light sources can be selectively activated to illuminate, the power consumption can be reduced by inactivating the unnecessary light sources.

In particular, according to the configuration of (6), since only the necessary area can be illuminated in accordance with the area shown in the image to be displayed, the power consumption can be reduced efficiently.

In particular, according to the configuration of (7), since the area that has been illuminated by the lightening device for driving is not illuminated any further, the power consumption can be reduced efficiently.

In particular, according to the configuration of (8), since the side area in the direction in which the driver intends to turn is illuminated, it is possible to illuminate only the area that the driver should note.

BRIEF DESCRIPTION OF DRAWINGS

FIG. 16 is a diagram illustrating the contents of an illumination table.

MODE TO CARRY OUT INVENTION

Hereinafter, preferred embodiments of the present invention will be described in detail with reference to the accompanying drawings.

<1. First Embodiment>
<1-1. System configuration>

Figure 1:
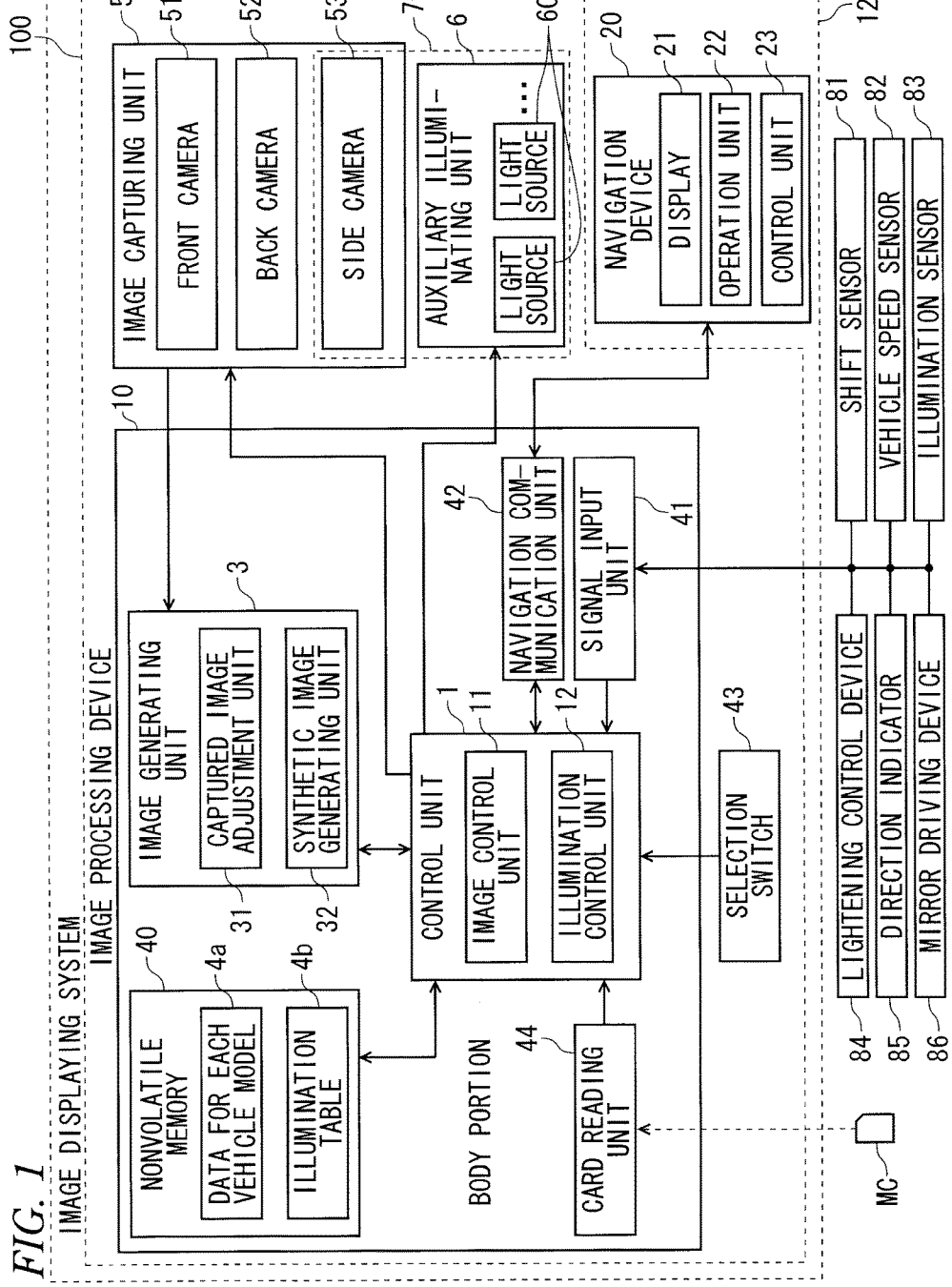
FIG. 1 is a block diagram illustrating the configuration of an image displaying system.

FIG. 1 is a block diagram illustrating the configuration of an image displaying system 120 according to a first embodiment. This image displaying system 120 is installed in a vehicle (in an embodiment of the present invention, a car), and has a function of generating an image through capturing images of a periphery of a vehicle and displaying the generated image in a cabin. A user (representatively, a driver) of the image displaying system 120 can grasp the appearance of the periphery of the vehicle substantially in real time by using the image displaying system 120.

As illustrated in FIG. 1, the image displaying system 120 mainly includes an image processing device 100 configured to generate peripheral images showing the periphery of the vehicle, and a navigation device 20 configured to display various kinds of information to a user in the vehicle. The peripheral images generated by the image processing device 100 are displayed on the navigation device 20.

The navigation device 20 performs navigation guidance for a user, and includes a display 21 such as a liquid crystal display having a touch panel function, an operation unit 22 for user's operation, and a control unit 23 controlling the whole device. The navigation device 20 is provided on an instrument panel or the like of the vehicle so that the user can recognize the screen of the display 21. Various kinds of instructions from the user are received by the operation unit 22 and the display 21 as the touch panel. The control unit 23 is configured as a computer having a CPU, a RAM, a ROM, and the like, and various kinds of functions including the navigation function are realized as the CPU performs arithmetic processing according to a predetermined program.

The navigation device 20 is communicably connected with the image processing device 100, and performs transmission and reception of various kinds of control signals with the image processing device 100 and reception of peripheral images generated by the image processing device 100. On the display 21, images based on the stand-alone function of the navigation device 20 are typically displayed, and the peripheral images showing the appearance of the periphery of the vehicle generated by the image processing device 100 under a predetermined condition. Through this, the navigation device 20 also functions as a display device for receiving and displaying the peripheral images generated by the image processing device 100.

The image processing device 100 includes a body portion 10 in which an ECU (Electronic Control Unit) having a function of generating peripheral images is provided, and is arranged on a predetermined position of the vehicle. The image processing device 100 is provided with the image capturing unit 5 capturing the images of the periphery of the vehicle, and functions as an image generation device that generates synthetic images viewed from a virtual viewpoint on the basis of the captured images obtained by capturing the image of the periphery of the vehicle through the image capturing unit 5. Further, the image processing apparatus 100 is provided with an auxiliary illuminating unit 6 performing an illumination to assist the image capturing through the image capturing unit 5, and functions as an in-vehicle illuminating apparatus performing the illumination to assist the image capturing through the image capturing unit 5. Vehicle cameras 51, 52, and 53 provided in the image capturing unit 5 and the light sources provided in the auxiliary illuminating unit 6 are arranged on appropriate positions of the vehicle, which differ from the body portion 10, and the details thereof will be described later.

The body portion 10 of the image processing device 100 mainly includes a control unit 1 controlling the whole device, an image generating unit 3 generating the peripheral images for display through processing the captured images acquired by the image capturing unit 5, and a navigation communication unit 42 communicating with the navigation device 20.

Various kinds of instructions from the user, which are received by the operation unit 22 or the display 21 of the navigation device 20, are received by the navigation communication unit 42 and are input to the control unit 1 as control signals. Further, the image processing device 100 includes a selection switch 43 that receives an instruction to switch the display contents from the user. The signal that indicates the user's instruction is also input from the selection switch 43 to the control unit 1. Through this, the image processing device 100 can operate in response to both the user's operation with respect to the navigation device 20 and the user's operation with respect to the selection switch 43. The selection switch 43 is arranged on an appropriate position of the vehicle that differs from the body portion 10.

The image generating unit 3 is configured as a hardware circuit that can perform various kinds of image processing, and includes a captured image adjustment unit 31 and a synthetic image generating unit 32 as main functions.

The captured image adjustment unit 31 performs adjustment of the captured images acquired by the image capturing unit 5, and performs adjustment of an image quality, such as brightness and contrast of the captured image, and correction of distortion. The captured image adjustment unit 31 refers to an average luminance that indicates the whole brightness of the captured image itself acquired by the image capturing unit 5, and adjusts the brightness of the captured image through performing of a gain adjustment according to the average luminance. Specifically, if the average luminance of the captured image is relatively high, the gain adjustment value is reduced, while if the average luminance of the captured image is relatively low, the gain adjustment value is increased. Through this, the captured image is adjusted relatively bright even if the surrounding environment of the vehicle is somewhat dark. However, in the case where the surrounding environment of the vehicle is very dark such as nighttime or the like, sufficient brightness of the displayed image may not be obtained even if the gain adjustment is performed, and thus illumination by the auxiliary illuminating unit 6 is required.

The synthetic image generating unit 32 generates a synthetic image viewed from a certain virtual viewpoint around the vehicle on the basis of captured images acquired by the vehicle cameras 51, 52, and 53 of the image capturing unit 5. The technique of generating the synthetic image viewed from the virtual viewpoint through the synthetic image generating unit 32 will be described later.

The captured image adjusted by the captured image adjustment unit 31 or the synthetic image generated by the synthetic image generating unit 32 is additionally adjusted as a display image, and then is output to the navigation device 20 through the navigation communication unit 42. Through this, the peripheral image showing the periphery of the vehicle is displayed on the display 21 of the navigation device 20.

The control unit 1 is configured as a computer having a CPU, a RAM, a ROM, and the like, and various kinds of control functions are realized as the CPU performs arithmetic processing according to a predetermined program. An image control unit 11 and an illumination control unit 12 shown in the drawing correspond to part of functions of the control unit 1 realized as described above.

The image control unit 11 controls the image processing that is executed by the image generating unit 3. For example, the image control unit 11 instructs various kinds of parameters that are required to generate the synthetic images generated by the synthetic image generating unit 31.

The illumination control unit 12 controls the illumination performed by the auxiliary illuminating unit 6. The illumination control unit 12 can selectively activate the light sources 60 included in the auxiliary illuminating unit 6. Specifically, the illumination control unit 12 selects the light sources 60 to be activated among the light sources 60, and output a signal for activating only the selected light sources 60 to the auxiliary illuminating unit 6.

Further, the body portion 10 of the image processing apparatus 100 additionally includes the nonvolatile memory 40, a card reading unit 44, and a signal input unit 41, which are connected to the control unit 1.

The nonvolatile memory 40 is configured as a flash memory or the like that can keep the stored contents even when the electric power is turned off. In the nonvolatile memory 40, data 4a for each vehicle model and an illumination table 4b are stored. The data 4a for each vehicle model may be data according to the vehicle model that is required when the synthetic image generating unit 31 generates the synthetic images. Further the illumination table may be table data that is referred to when the illumination control unit 12 selects the light sources to be activated among the light sources 60 in the auxiliary illuminating unit 6.

The card reading unit 44 reads a memory card MC that is a portable recording medium. The card reading unit 44 includes a card slot in which the memory card MC is removably mounted, and reads data recorded on the memory card MC that is mounted in the card slot. The data read by the card reading unit 44 is input to the control unit 1.

The memory card MC is composed of a flash memory or the like that can store various kinds of data, and the image processing device 100 can use the various kinds of data stored in the memory card MC. For example, by storing a program in the memory card MC and reading the program from the memory card MC, it becomes possible to update the program (firmware) that realizes the function of the control unit 1. Further, by storing, in the memory card MC, data for each vehicle model that corresponds to a vehicle model that is different from that of the data 4a for each vehicle model stored in the nonvolatile memory 40, and reading and storing the data in the nonvolatile memory 40, it becomes possible to make the image displaying system 120 correspond to a different kind of vehicle model.

Further, signals from various kinds of devices provided in the vehicle are input to the signal input unit 41. Through this signal input unit 41, the signals from the outside of the image display system 120 are input to the control unit 1. Specifically, the signals indicating various kinds of information are input from a shift sensor 81, a vehicle speed sensor 82, an illumination sensor 83, a lightening control device 84, a direction indicator 85, and a mirror driving device 86 to the control unit 1.

From the shift sensor 81, positions of operations of a shift lever of a transmission of the vehicle 9, that is, shift positions of "P (Park)", "D (Drive)", "N (Neutral)", and "R (Reverse)", are input. From the vehicle speed sensor 82, a driving speed (km/h) of the vehicle 9 at that time is input.

The illumination sensor 83 is attached to a center upper portion of a front window or a dashboard of the vehicle, and detects the illumination showing the brightness of the surrounding environment of the vehicle. The illumination that is output from the illumination sensor 83 as the result of the detection is input to the control unit.

The lightening control device 84 controls the lightening devices for driving, which are provided on the vehicle in standards, unlike the auxiliary illuminating unit 6, to be used in typical driving of the vehicle. The lightening devices include headlights (head lamps), small lamps (sidelights), tail lamps (tail lights), brake lamps (brake lights), and back lamps (back lights). The lightening control device 84 turns on the headlights or small lamps in response to a driver's operation, and turns on the tail lamps when turning on the headlights or small lamps. Further, the lightening control device 84 operates to turn on the brake lamps when the driver steps on the brake pedal, and operates to turn on the back lamps when the shift position is "R". The turn-on states of various kinds of lightening devices for driving are input to the control unit.

From the direction indicator 85, a turn signal that indicates a turning direction on the basis of the operation of a turn signal switch, that is, a turning direction that is intended by a vehicle driver, is input to the control unit. When the turn signal switch is operated, a turn signal is generated, and the turn signal indicates the operated direction (left direction or right direction). When the turn signal switch is in a neutral position, the turn signal is turned off.

Further, the mirror driving device 86 closes or opens the door mirror of the vehicle in response to the operation of the driver. From the mirror driving device 86, a door minor state (closed/opened) signal is input to the control unit.

<1-2. Image Capturing Unit and Auxiliary Illuminating Unit>

Then, the image capturing unit 5 and the auxiliary illuminating unit 6 of the image displaying device 100 will be described in detail. The image capturing unit 5 and the auxiliary illuminating unit 6 are electrically connected to the control unit 1, and operate on the basis of signals from the control unit 1.

The image capturing unit 5 includes vehicle cameras, that is, a front camera 51, a back camera 52, and side cameras 53. The vehicle cameras 51, 52, and 53 are provided with image pickup devices, such as CCD or CMOS, and electronically acquire images.

Figure 2:
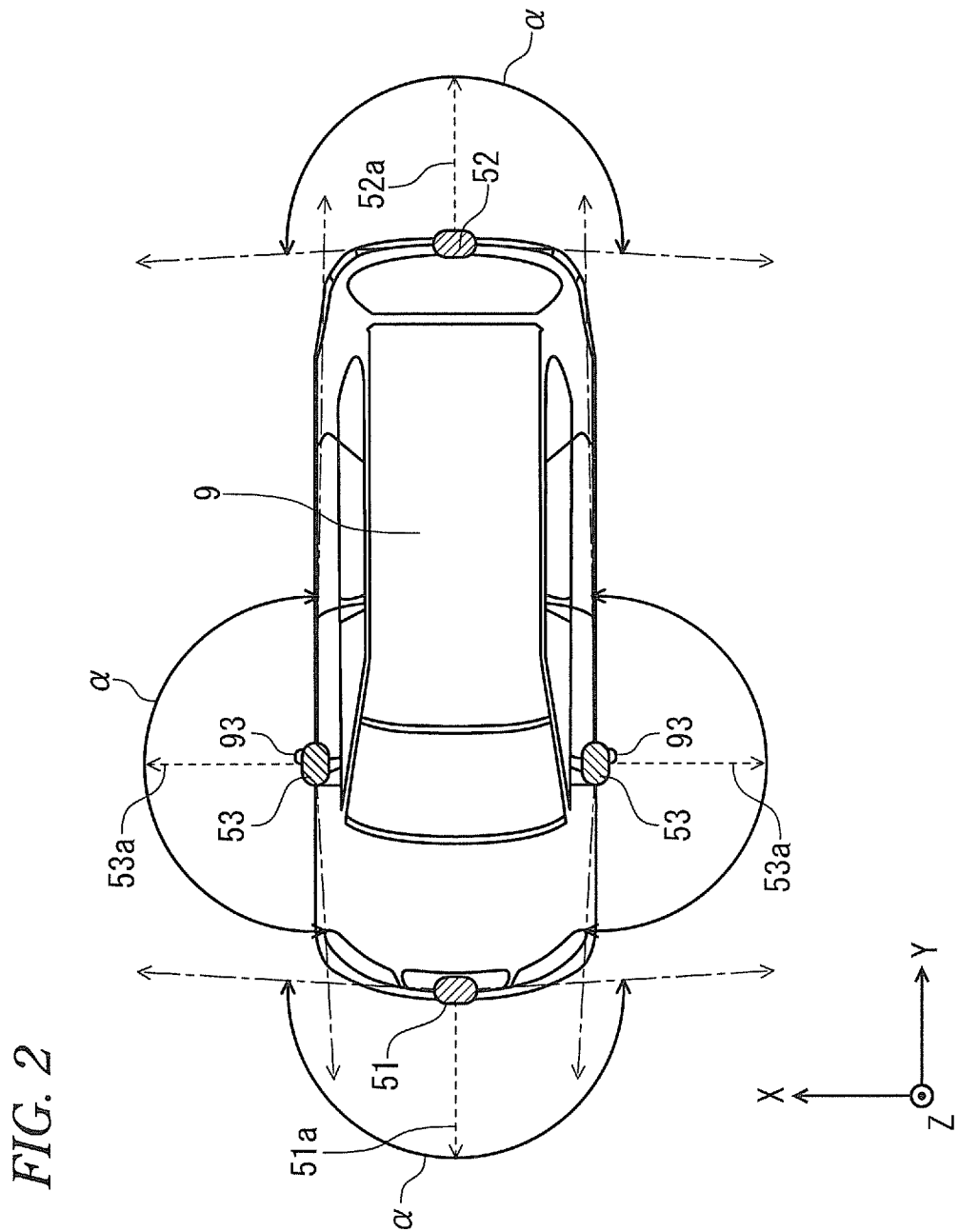
FIG. 2 is a view illustrating positions on which vehicle cameras are installed in a vehicle.

FIG. 2 is a view illustrating positions on which the vehicle cameras 51, 52, and 53 are installed. In the following description, when describing the orientation and direction, three-dimensional XYZ orthogonal coordinates as shown in the drawing are appropriately used. The XYZ axes are relatively fixed against the vehicle 9. Here, the X-axis direction is along the left/right direction of the vehicle 9, the Y-axis direction is along the forward/rearward direction of the vehicle 9, and the Z-axis direction is along the vertical direction. Further, for convenience, it is assumed that +X side is the right side of the vehicle 9, +Y side is the rear side of the vehicle 9, and +Z side is the upper side.

The front camera 51 is provided in the vicinity of the mounting position of the vehicle license plate at the front end of the vehicle 9, and its optical axis 51a is directed in the straight direction (−Y side in the Y-axis direction as viewed in a plane) of the vehicle 9. The back camera 52 is provided in the vicinity of the mounting position of the vehicle license plate at the rear end of the vehicle 9, and its optical axis 52a is directed in the opposite direction (+Y side in the Y-axis direction as viewed in a plane) of the straight direction of the vehicle 9. Further, the side cameras 53 are provided on the left and right door mirrors 93, and its optical axis 53a is directed to the outside along the left/right direction (the X-axis direction as viewed in a plane) of the vehicle 9. On the other hand, although it is preferable that the attachment position of the front camera 51 or the back camera 52 is substantially at the center of the vehicle, it may be shifted somewhat to the left or right direction from the center of the vehicle.

Fish-eye lenses are adopted as lenses of the vehicle cameras 51, 52, and 53, and the vehicle cameras 51, 52, and 53 have an angle of view of 180 degrees or more. Accordingly, by using the four vehicle cameras 51, 52, and 53, it is possible to capture images of the whole periphery of the vehicle 9.

Referring again to FIG. 1, the auxiliary illuminating unit 6 includes six light sources 60 that perform the illumination to assist in image capturing by the image capturing unit 5. Each of the light sources 60 is composed of LEDs that emit near-infrared light that is invisible light.

Since the near-infrared light is invisible to the human eye, it does not affect a pedestrian who is present in the periphery of the vehicle 9 even if the periphery of the vehicle 9 is illuminated by the light sources 60 of the auxiliary illuminating unit 6. On the other hand, image pickup devices adopted in the vehicle cameras 51, 52, and 53 have a sensitivity of near-infrared light. Because of this, in the case where the surrounding environment of the vehicle 9 is relatively dark, an image of sufficient brightness, which indicates the state of the area, can be acquired, without affecting the pedestrian or the like, by illuminating the peripheral area of the vehicle 9 with the near-infrared light from the light sources of the auxiliary illuminating unit 6 as the auxiliary light.

The auxiliary illuminating unit 6 illuminates the peripheral area of the vehicle 9. Three of the six light sources 60 of the auxiliary illuminating unit 6 are arranged on the left side of the vehicle 9, and three remaining light sources 60 are arranged on the right side of the vehicle 9. Three light sources 60 on the left side of the vehicle 9, along with the side camera 53 on the left side of the vehicle 9, are integrally accommodated in the same housing to form a side camera unit 70. In the same manner, three light sources 60 on the right side of the vehicle 9, along with the side camera 53 on the right side of the vehicle 9, are integrally accommodated in the same housing to form a side camera unit 70.

Figure 3:
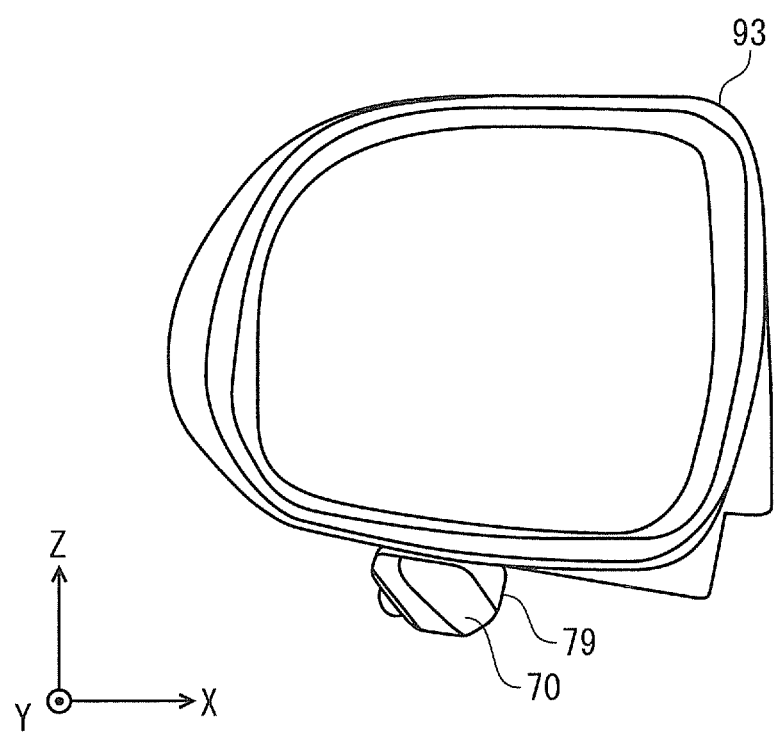
FIG. 3 is a view illustrating the external configuration of a side camera unit.

FIG. 3 is a view illustrating the external configuration of a side camera unit 70 on the left side. Since the side camera units 70 are symmetrically configured and arranged between the left and right sides of the vehicle 9, the left side of the vehicle 9, which is the same as the right side thereof, will be described in detail as an example. As shown in the drawing, the side camera unit 70 is arranged on the lower side of the door minor 93 through a bracket 79.

Figure 4:
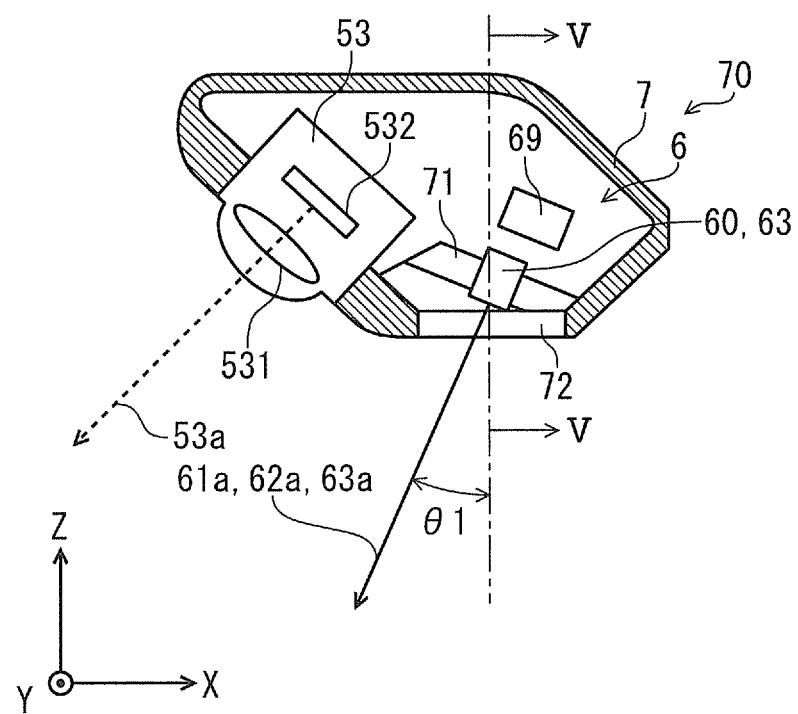
FIG. 4 is a cross-sectional view of a side camera unit viewed from the rear of a vehicle.
Figure 5:
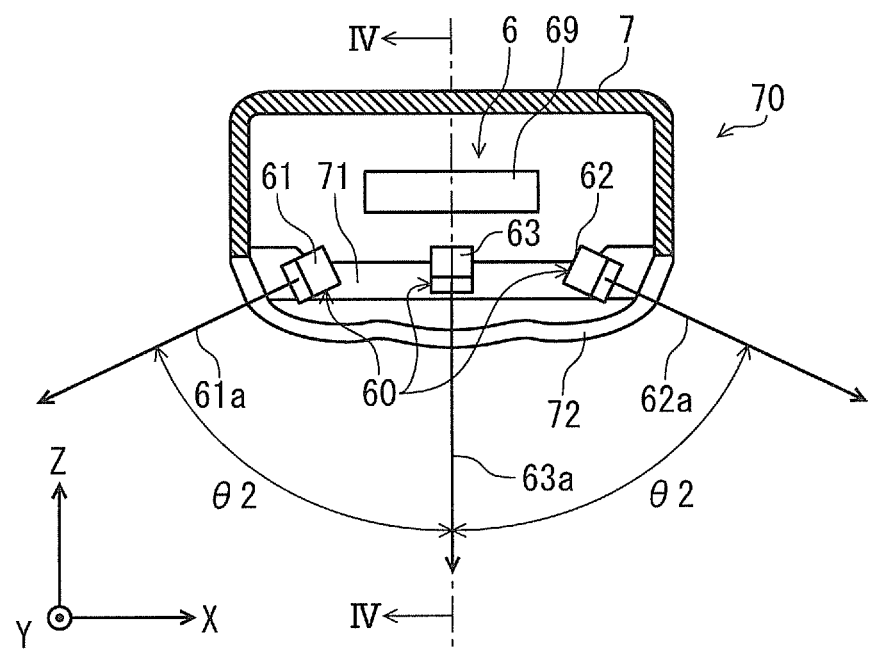
FIG. 5 is a cross-sectional view of a side camera unit viewed from the left side of a vehicle.

FIG. 4 is a cross-sectional view of the left side camera unit 70 viewed from the rear (+Y side) of the vehicle 9 on a XZ plane. Further, FIG. 5 is a cross-sectional view of the left side camera unit 70 viewed from the left (−X side) of the vehicle 9 on a YZ plane. FIG. 5 corresponds to the cross-sectional view at a position V-V of FIG. 4, and FIG. 4 corresponds to the cross-sectional view at a position IV-IV of FIG. 5.

As shown in the drawings, the side camera unit 70 has a housing 7 that is a case. In this housing 7, the side camera 53, three light sources 60 of the auxiliary illuminating unit 6, and a light source driving unit 69 are accommodated. Specifically, three light sources 60 include the front light source 61 mainly illuminating a front area of the vehicle, the rear light source 62 mainly illuminating a rear area of the vehicle 9, and the center light source 63 mainly illuminating an area disposed between the areas illuminated by the front light source 61 and the rear light source 62. The light source driving unit 69 makes the three light sources 60 emit light through supplying the power to the light sources 60.

The side camera 53 is configured to be provided with a lens 531 and an image pickup device 532. As shown in FIG. 4, the side camera 53 is partially arranged in the housing 7, and the optical axis 53a is directed toward the outside of the vehicle 9. The side camera 53 is fixed to the housing 7 so that the direction of the optical axis 53a has a predetermined angle (for example, about 45 degrees) with respect to the vertical direction.

The three light sources 60 of the auxiliary illuminating unit 6 are arranged on the inner side (+X side) of the side camera 53. The light axes 61a, 62a, and 63a of the three light sources 61, 62, and 63 are directed to the outside of the vehicle 9, and their directions are all at a predetermined angle $\theta 1$ with respect to the vertical direction viewed from the forward/rearward direction (Y-axis direction) of the vehicle 9. It is preferable that the angle $\theta 1$ is, for example, 30 degrees or less.

Further, as illustrated in FIG. 5, the center light source 63 is arranged in the center portion in the housing 7, and the front light source 61 and the rear light source 62 are symmetrically arranged with respect to the center in the housing 7. The direction of the light axis 63a of the center light source 63 is along the vertical direction (Z-axis direction), the direction of the light axis 61a of the front light source 61 is inclined to the front side (-Y side) of the vehicle 9, and the direction of the light axis 62a of the rear light source 62 is inclined to the rear side (+Y side) of the vehicle 9. Further, the direction of the light axis 61a of the front light source 61 and the direction of the light axis 62a of the rear light source 62 are symmetrical with respect to the direction of the light axis 63a of the center light source 63. That is, the angle between the light axis 63a of the center light source 63 and the light axis 61a of the front light source 61 coincides with the angle between the light axis 63a of the center light source 63 and the light axis 62a of the rear light source 62, and becomes a predetermined angle $\theta 2$. It is preferable that the angle $\theta 2$ is, for example, equal to or more than 60 degrees and equal to or less than 70 degrees.

The three light sources 60 of the auxiliary illuminating unit 6 are fixed to the housing 7 by a fixing member 71 so that they have the above-described positions and directions. That is, the three light sources 60 are fixed to the housing in a state where their light axes are directed to different directions from each other. In a portion of the housing 7 corresponding to the lower portion of the fixing positions of the light sources 60, a transmitting member 72 that transmits the near-infrared light has been adopted. Through this, the auxiliary light of the light source 60 can be projected to the outside of the housing 7.

Figure 6:
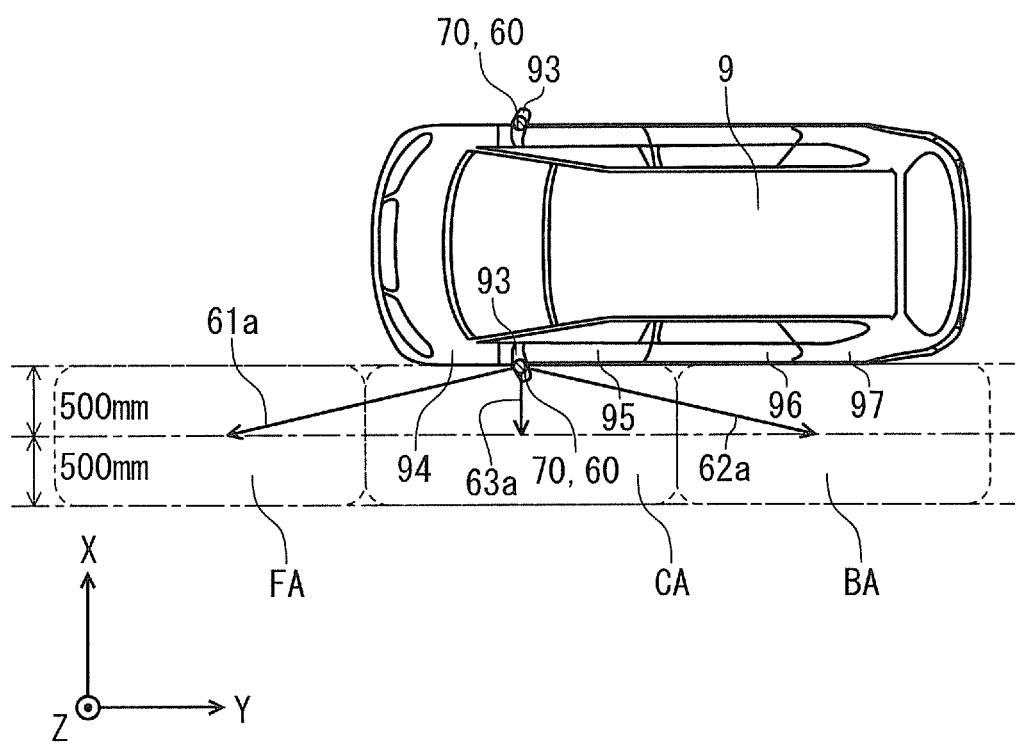
FIG. 6 is a view illustrating a positional relationship among light axes of three light sources with respect to a vehicle.
Figure 7:
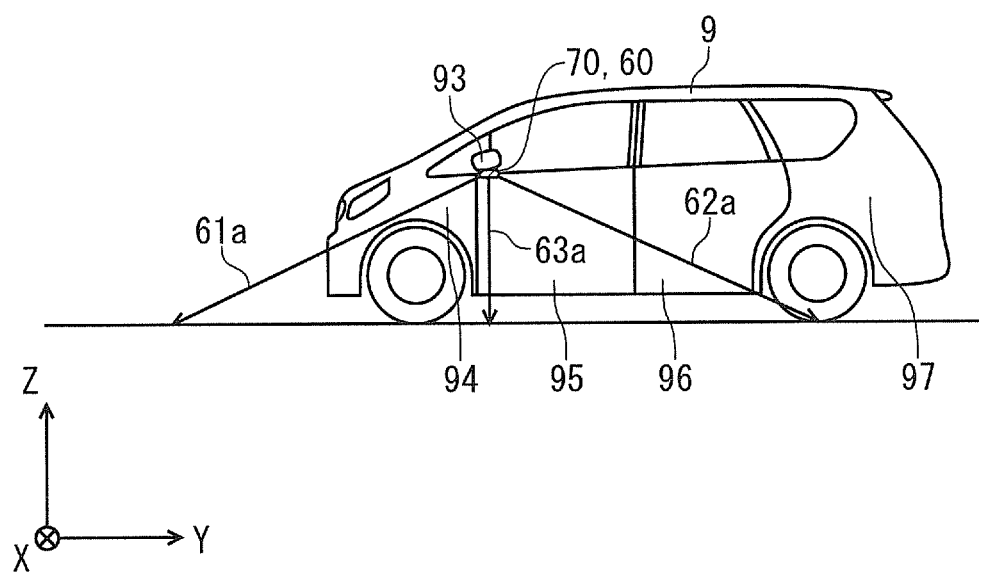
FIG. 7 is a view illustrating a positional relationship among light axes of three light sources with respect to a vehicle.

FIGS. 6 and 7 are views illustrating the positional relationship among the light axes of three light sources 60 in the left side camera unit 70. FIG. 6 is a top view (viewed from the +Z side), and FIG. 7 is a side view (viewed from the −X side).

As shown in the drawings, the light axes 61a, 62a, and 63a of the three light sources 60 are extended toward positions that are apart for 500 mm in the X-axis direction with respect to the side surface of the vehicle 9 from the side camera unit 70 provided on the door mirror 93. The directions of the light axes 61a, 62a, and 63a of the three light sources 60 are different from each other. Specifically, as viewed from the plane (see FIG. 6), The light axis 61a of the front light source 61 is along the left/right direction (X-axis direction) of the vehicle 9, the light axis 61a of the front light source 61 is directed to the front side (−Y side) of the vehicle 9, and the light axis 62a of the rear light source 62 is directed to the rear side (+Y side) of the vehicle 9. Further, as viewed from the side (see FIG. 7), the light axis 63a of the center light source 63 is along the vertical direction (Z-axis direction), the light axis 61a of the front light source 61 is directed to the front side (−Y side) of the vehicle 9, and the light axis 62a of the rear light source 62 is directed to the rear side (+Y side) of the vehicle 9. The direction of the light axis 61a of the front light source 61 and the direction of the light axis 62a of the rear light source 62 are symmetrical with respect to the direction of the light axis 63a of the center light source 63.

Through this arrangement of the light axes, the illumination of the side area of the vehicle 9 is shared by the three light sources 61, 62, and 63. As the side area to be illuminated, a predetermined area that is relatively fixed with respect to the vehicle 9 is set. Specifically, in the forward/rearward direction (Y-axis direction) of the vehicle, the side area to be illuminated is from the position that is approximately 2 m ahead of the front end of the vehicle 9 approximately up to the rear end position of the vehicle 9. Further, in the left/right direction (X-axis direction) of the vehicle 9, the side area to be illuminated is from the position on the side of the vehicle 9 up to the position that is approximately 1 m apart from the outside thereof.

The front light source 61 mainly illuminates an area in the front of the front end of the vehicle 9 (hereinafter referred to as a "front area") FA. The rear light source 62 mainly illuminates an outside area in the vicinity of a rear door 96 and a rear fender 97 of the vehicle 9 (hereinafter referred to as a "rear area") BA. The center light source 63 mainly illuminates an outside area in the vicinity of a front fender 94 and a front door 95 of the vehicle, that is between the front area FA and the rear area BA, (hereinafter referred to as a "center area") CA.

As described above, in this embodiment, three light sources 60 that illuminate the side area in the same direction of the vehicle 9 are fixed and accommodated in a state where the directions of the light axes in the same housing 7 are different from each other. Accordingly, the three light sources 60 are integrated into a side camera unit 70 by the housing 7. Through this, the light sources 60 can be attached at a time through attachment of the side camera unit 70 only. Further, it is necessary to arrange power supply lines or control lines for the three light sources 60 up to the position of one side camera unit 70. Through this, it becomes possible to attach the light sources 60 for wide illumination of the side area of the vehicle 9 to the vehicle 9 in a simple manner and at low cost.

Further, in the housing 7 of the side camera unit 70, a side camera 53 for capturing images of the side area of the vehicle 9 is accommodated along with three light sources 60 so that the three light sources 60 and the side camera 53 are integrated. Accordingly, through attachment of the side camera 70 only, the side camera 53 and the light sources 60 can be collectively and easily attached to the vehicle 9 at low cost. As a result, the cost for attachment of the whole image displaying system 120 to the vehicle 9 can be greatly reduced.

Further, in the side camera unit 70, the direction of the light axis 61a of the front light source 61 and the direction of the light axis 62a of the rear light source 62 are symmetrical with respect to the direction of the light axis 63a of the center light source 63. Through this, even in the case where the side camera unit 70 is arranged in either the left side or the right side, the light axes of the three light sources 60 can be directed to the same direction with respect to the vehicle 9. Accordingly, since the side camera unit 70 can be commonly used for both the left and right sides of the vehicle 9, it is not required to provide a dedicated device on the left side or right side as the side camera unit 70, and thus the manufacturing cost can be reduced.

Further, in the case of sharing the illumination of the side area through the three light sources 60, it is considered that the brightness of each part of the side area differs depending on the light source 60 that performs the illumination, and thus the brightness of the whole side area becomes non-uniform. To cope with this, in this embodiment, the light quantities of the three light sources 60 that are arranged on the same side camera unit 70 are adjusted.

Figure 8:
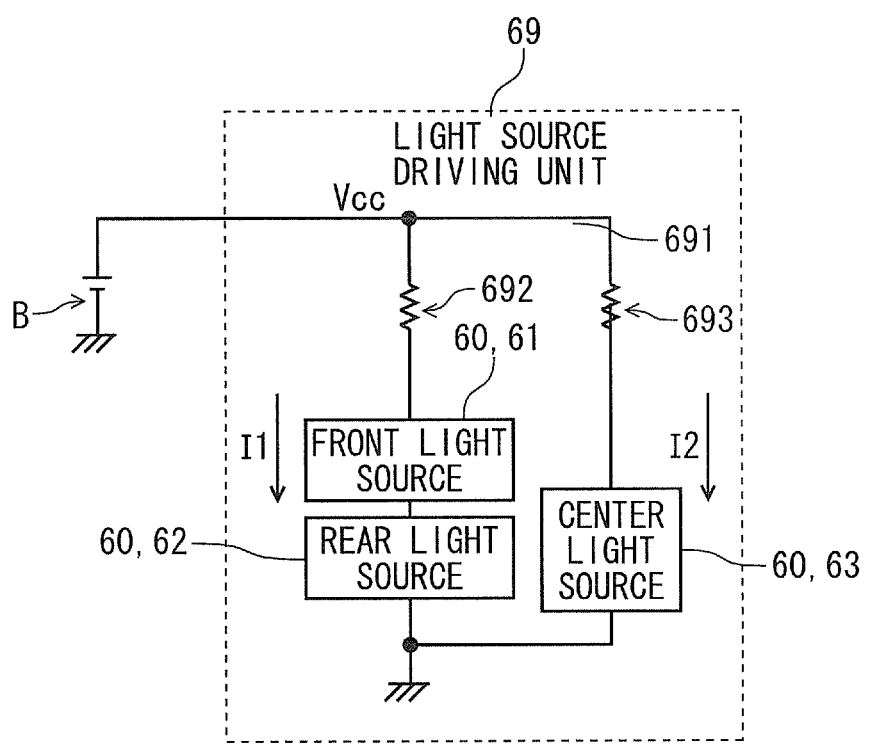
FIG. 8 is a diagram schematically illustrating a circuit for supplying power to three light sources.

FIG. 8 is a diagram schematically illustrating a circuit for supplying power to three light sources 60 in a light source driving unit 69 provided in a side camera unit 70.

A power of a predetermined voltage Vcc (for example, 6 V) is supplied from a battery B provided in the vehicle to the three light sources 60 through a power line 691. The front light source 61 and the rear light source 62 are connected in series to each other, and are connected to the power line 691 through a predetermined resistor 692. On the other hand, the center light source 63 is connected to the power line 691 through a parallel path that is different from the path of the front light source 61 and the rear light source 62, which is connected to a predetermined resistor 693.

Through this, the same current I1 flows to the front light source 61 and the rear light source 62, and current I2 that is different from the current I1 flows to the center light source 63. The three light sources 61, 62, and 63 have the same resistance value. Further, the resistor 693 that is connected in series to the center light source 63 has the resistance value that is larger than the resistance value of the resistor 692 that is connected in series to the front light source 61 and the rear light source 62. Through this, the current I2 flowing to the center light source 63 is lower than the current I1 flowing to the front light source 61 and the rear light source 62. For example, the current I2 is preferably less than 30% of the current I1, and more preferably less than 20% thereof.

Since the light quantity of the light source 60 depends on the current, the front light source 61 and the rear light source 62 have the same light quantity, and the light quantity of the center light source 63 becomes smaller than the light quantity of the front light source 61 and the rear light source 62. The center light source 63 illuminates an area that is relatively close to the position of the side camera unit 70

(position in which three light sources 60 are arranged). Accordingly, by making the light quantity of the center light source 63 be relatively smaller than the light quantity of the front light source 61 and the rear light source 62, it becomes possible to uniformly illuminate the whole side area of the vehicle 9 from the front side to the rear side of the vehicle 9.

On the other hand, in this embodiment, if three light sources 60 are arranged in the same housing 7, heat generated by the light sources 60 may also cause a problem. Accordingly, in the light source driving unit 69, it is preferable to suppress the heat generated by the light sources 60 and the like by limiting the total value of the current I1, the current I2, and other current (other than the current flowing through the light sources 60) to less than a predetermined value (for example, 200 mA). This is realized by adjusting the values of the resistors 692 and 693.

<1-3. Image Conversion Processing>

Figure 9:
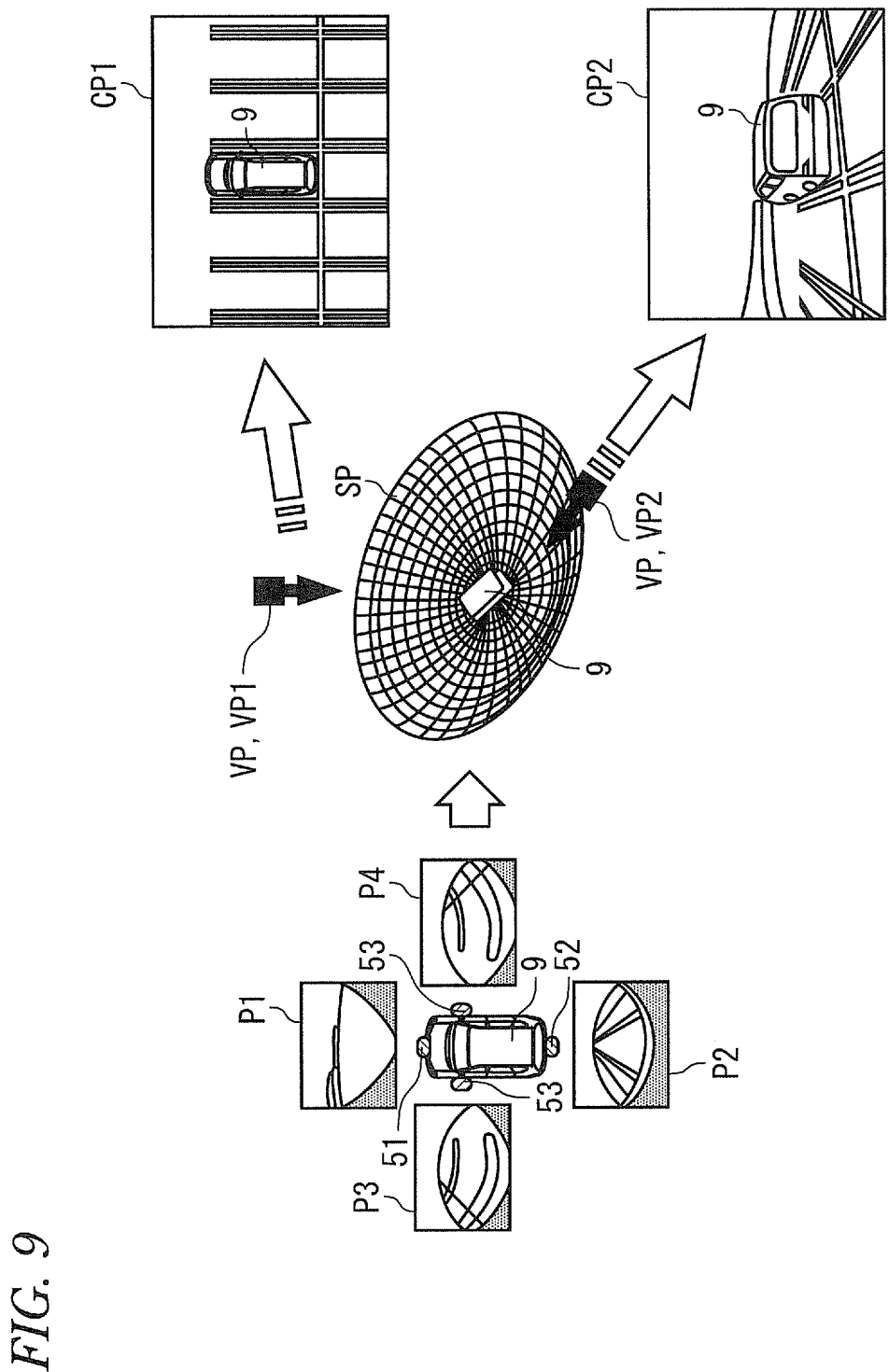
FIG. 9 is a view illustrating a technique of generating a synthetic image.

Then, a technique in which the synthetic image generating unit 32 of the image generating unit 3 generates synthetic images showing the appearance of the periphery of the vehicle 9 viewed from a certain virtual viewpoint on the basis of captured images obtained by the image capturing unit 5 will be described. In the case of generating the synthetic images, data for each vehicle model pre-stored in the nonvolatile memory 4a is used. FIG. 9 is a view illustrating the technique of generating synthetic images.

If image capturing is performed simultaneously in the front camera 51, the back camera 52, and the side camera 53 of the image capturing unit 5, four captured images P1 to P4 showing the front, rear, left, and right sides of the vehicle 9 are acquired. That is, the four captured images P1 to P4 acquired by the image capturing unit 5 contain information showing the whole periphery of the vehicle 9 at the time of image capturing.

Then, respective pixels of the four captured images P1 to P4 are projected onto a three-dimensional (3D) curved surface SP in a virtual three-dimensional space. The 3D curved surface SP, for example, is substantially in a hemispheric shape (bowl shape), and the center portion thereof (the bottom portion of the bowl) is determined as the position in which the vehicle 9 is present. The correspondence relationship has been determined in advance between the positions of the respective pixels included in the captured images P1 to P4 and the positions of the respective pixels of the 3D curved surface SP. Accordingly, the values of the respective pixels of the 3D surface SP can be determined on the basis of the values of the respective pixels included in the captured images P1 to P4.

The correspondence relationship between the positions of the respective pixels of the captured images P1 to P4 and the positions of the respective pixels of the 3D curved surface SP depends on the arrangement (mutual distance, height above ground, optical axis angle, and the like) of the four vehicle cameras 51, 52, and 53 on the vehicle 9. Because of this, table data that indicates the correspondence relationship is included in the data 4a for each vehicle model stored in the nonvolatile memory 40.

Further, polygon data that indicates the shape or size of the vehicle body included in the data 4a for each vehicle model is used, and a vehicle image that is a polygon model that shows the 3D shape of the vehicle 9 is virtually configured. The configured vehicle image is arranged in the center portion of the substantially hemispheric shape that corresponds to the position of the vehicle 9 in the 3D space in which the 3D curved surface SP is set.

Further, in the 3D space in which the 3D curved surface SP is present, the virtual viewpoint VP is set by the control unit 1. The virtual viewpoint VP is defined by the viewpoint position and the viewing direction, and is set at a certain viewpoint position that corresponds to the periphery of the vehicle and toward a certain viewing direction in the 3D space.

Then, depending on the set virtual viewpoint VP, a necessary area in the 3D curved surface SP is cut off as an image. The relationship between the virtual viewpoint VP and the necessary area in the 3D curved surface SP is predetermined and pre-stored in the nonvolatile memory 40 as the table data. On the other hand, rendering is performed with respect to the vehicle image configured as a polygon to correspond to the set virtual viewpoint VP, and two-dimensional (2D) vehicle image that is the result of the rendering overlaps the cut image. Through this, synthetic images showing the appearance of the vehicle 9 and the periphery of the vehicle 9 viewed from a certain virtual time point are generated.

For example, if a virtual viewpoint VP1 is set in a state where the viewpoint position is a position directly above almost the center of the position of the vehicle 9, and the viewing direction is almost directly below of the vehicle 9, a synthetic image CP1 showing the appearance of the vehicle 9 (actually, vehicle image) and the periphery of the vehicle 9 viewed from almost directly above of the vehicle 9 is generated. Further, as shown in the drawing, if a virtual viewpoint VP2 is set in a state where the viewpoint position is the left rear of the position of the vehicle 9, and the viewing direction is almost front of the vehicle 9, a synthetic image CP2 showing the appearance of the vehicle 9 (actually, vehicle image) and the periphery of the vehicle 9 viewed from the left rear of the vehicle 9 to the whole periphery thereof is generated.

On the other hand, in the case of actually generating the synthetic images, it is not necessary to determine the values of all the pixels of the 3D curved surface SP, but by determining only the values of the pixels of the area that becomes necessary to correspond to the set virtual viewpoint VP on the basis of the captured images P1 to P4, the processing speed can be improved.

<1-4. Operating Mode>

Figure 10:
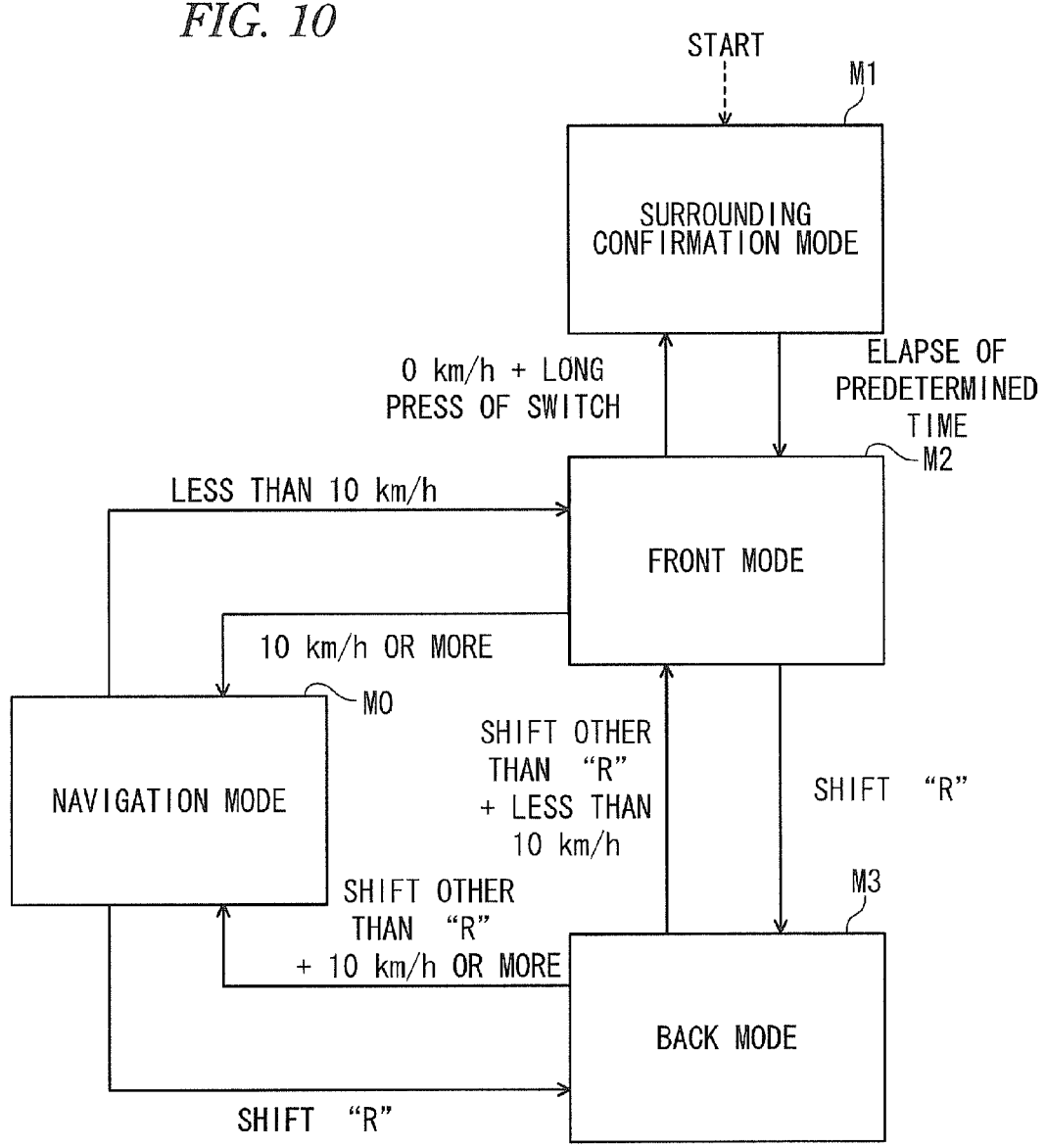
FIG. 10 is a diagram illustrating transition of an operating mode in an image displaying system.

Then, the operating mode of the image displaying system 120 will be described. FIG. 10 is a diagram illustrating transition of an operating mode in an image displaying system 120. The image displaying system 120 has four operating modes of a navigation mode M0, a surrounding confirmation mode M1, a front mode M2, and a back mode M3. These operating modes are switched under the control of the control unit 1 depending on the operation of the driver or the driving state of the vehicle 9.

The navigation mode M0 is an operating mode in which a map image for a navigation guide is displayed on the display 21 by the function of the navigation device 20. In the navigation mode M0, the function of the image processing device 100 is not used, but various kinds of display are performed by the function of the navigation device 20 itself. Accordingly, in the case where the navigation device 20 has a function of receiving and displaying radio waves of television broadcasting, a television broadcasting screen may be displayed instead of the map image for the navigation guide.

By contrast, the surrounding confirmation mode M1, the front mode M2, and the back mode M3 are operating modes in which a display image showing the situation of the periphery of the vehicle 9 in real time is displayed on the display 21 using the function of the image processing device 100.

The surrounding confirmation mode M1 is an operating mode to perform animated representation that shows orbiting around the vehicle 9 as viewing the vehicle 9 downward. The front mode M2 is an operating mode in which a display image showing mainly the front or side of the vehicle 9 that is necessary during the forward movement of the vehicle 9 is displayed. Further, the back mode M3 is an operating mode in which a display image showing mainly the rear of the vehicle 9 that is necessary during the rearward movement of the vehicle 9 is displayed.

If the image displaying system 120 starts, the surrounding confirmation mode M1 is initially set. In the case of the surrounding confirmation mode M1, if a predetermined time (for example, 6 seconds) elapses after performing the animated representation that shows orbiting around the vehicle 9, the mode is automatically switched to the front mode M2. Further, in the case of the front mode M2, if the selection switch 43 is continuously pressed for a predetermined time in a state of 0 km/h (stopped state), the mode is switched to the surrounding confirmation mode M1. On the other hand, the mode may be switched from the surrounding confirmation mode M1 to the front mode M2 by a predetermined instruction from the driver.

Further, in the case of the front mode M2, if the driving speed becomes, for example, 10 km/h or more, the mode is switched to the navigation mode M0. By contrast, in the case of the navigation mode M0, if the driving speed input from vehicle speed sensor 82 becomes, for example, less than 10 km/h, the mode is switched to the front mode M2.

In the case where the driving speed of the vehicle 9 is relatively high, the front mode M2 is released in order to make the driver concentrate on driving. By contrast, in the case where the driving speed of the vehicle 9 is relatively low, the driver may drive a vehicle with more consideration of the situation around the vehicle 9, specifically, approaching to the intersection with poor visibility, changing directions, or moving toward the roadside. Due to this, in the case where the driving speed is relatively low, the mode is switched from the navigation mode M0 to the front mode M2. On the other hand, in the case where the mode is switched from the navigation mode M0 to the front mode M2, the condition that there is an explicit operation instruction from the driver may be added to the condition that the driving speed is less than 10 km/h.

Further, in the case of the navigation mode M0 or the front mode M2, if the position of the shift lever that is input from the shift sensor 81 is "R (Reverse)", the mode is switched to the back mode M3. That is, if the transmission of the vehicle 9 is operated to the position of "R (Reverse)", the vehicle 9 moves rearward, and thus the mode is switched to the back mode M3 mainly showing the rear of the vehicle 9.

On the other hand, in the case of the back mode M3, if the position of the shift lever is any position except for "R (Reverse)", the mode is switched to the navigation mode M0 or the front mode M2 on the basis of the driving speed at that time. That is, if the driving speed is 10 km/h or more, the mode is switched to the navigation mode M0, while if the driving speed is less than 10 km/h, the mode is switched to the front mode M2.

Hereinafter, the display modes of the periphery of the vehicle 9 in the surrounding confirmation mode M1, the front mode M2, and the back mode M3 will be described in detail.

<1-5. Surrounding Confirmation Mode>

Figure 11:
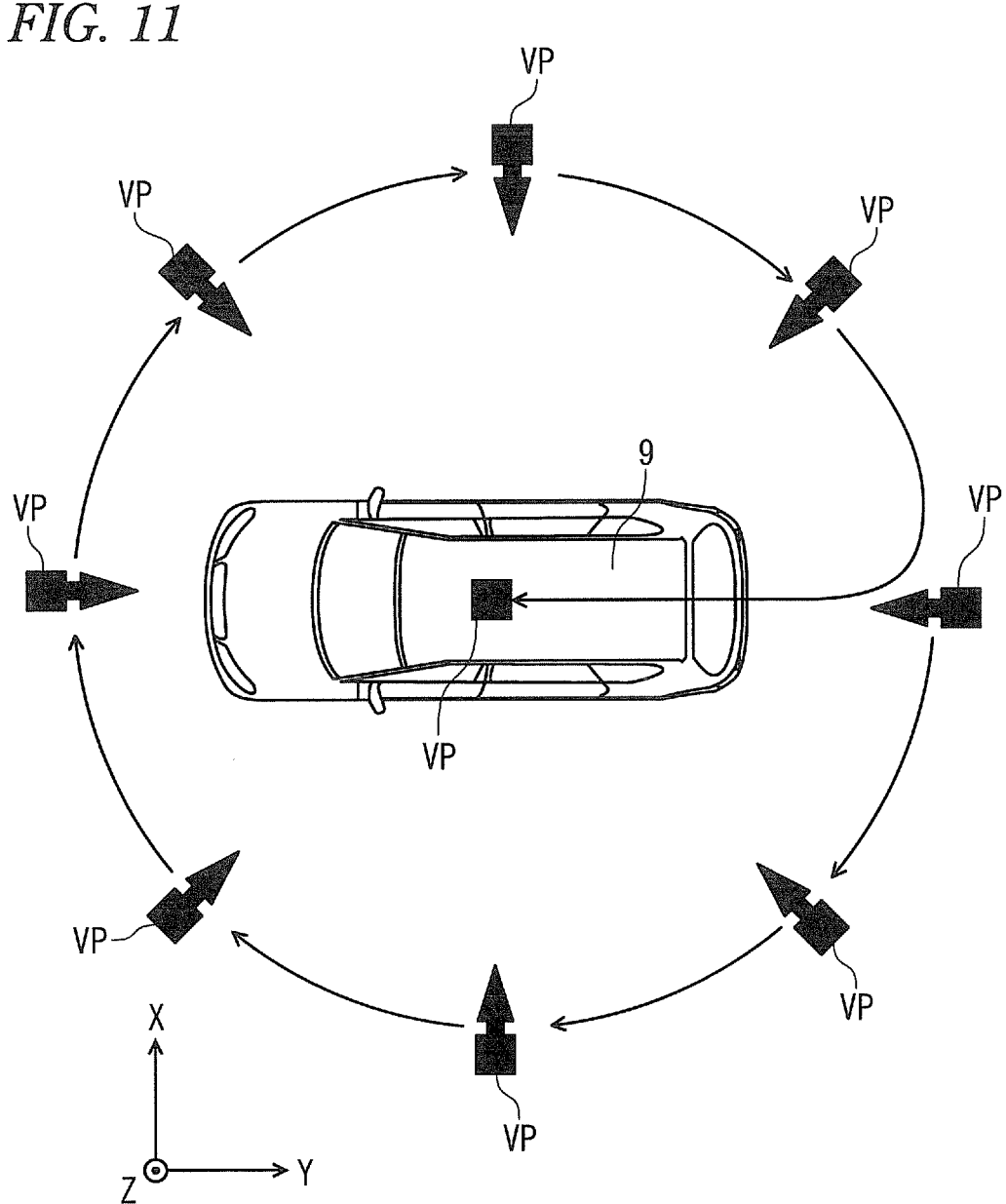
FIG. 11 is a view illustrating a transition of positions of virtual viewpoints in a surrounding confirmation mode.

First, the display mode of the periphery of the vehicle 9 in the surrounding confirmation mode M1 will be described. In the surrounding confirmation mode M1, as shown in FIG. 11, the virtual viewpoint VP is set to view the vehicle 9 downward, and the virtual viewpoint VP is continuously moved so as to orbit around the vehicle 9. The virtual viewpoint VP is initially set to the rear of the vehicle 9, and then orbits around the vehicle 9 clockwise. Through this, if the virtual viewpoint VP is moved up to the rear of the vehicle through the left, front, and right sides of the vehicle 9, it is moved up to directly above of the vehicle 9.

In a state where the virtual viewpoint VP has been moved as described above, synthetic images are continuously generated. The generated synthetic images are sequentially output to the navigation device 20 and are continuously displayed on the display 21.

Figure 12:
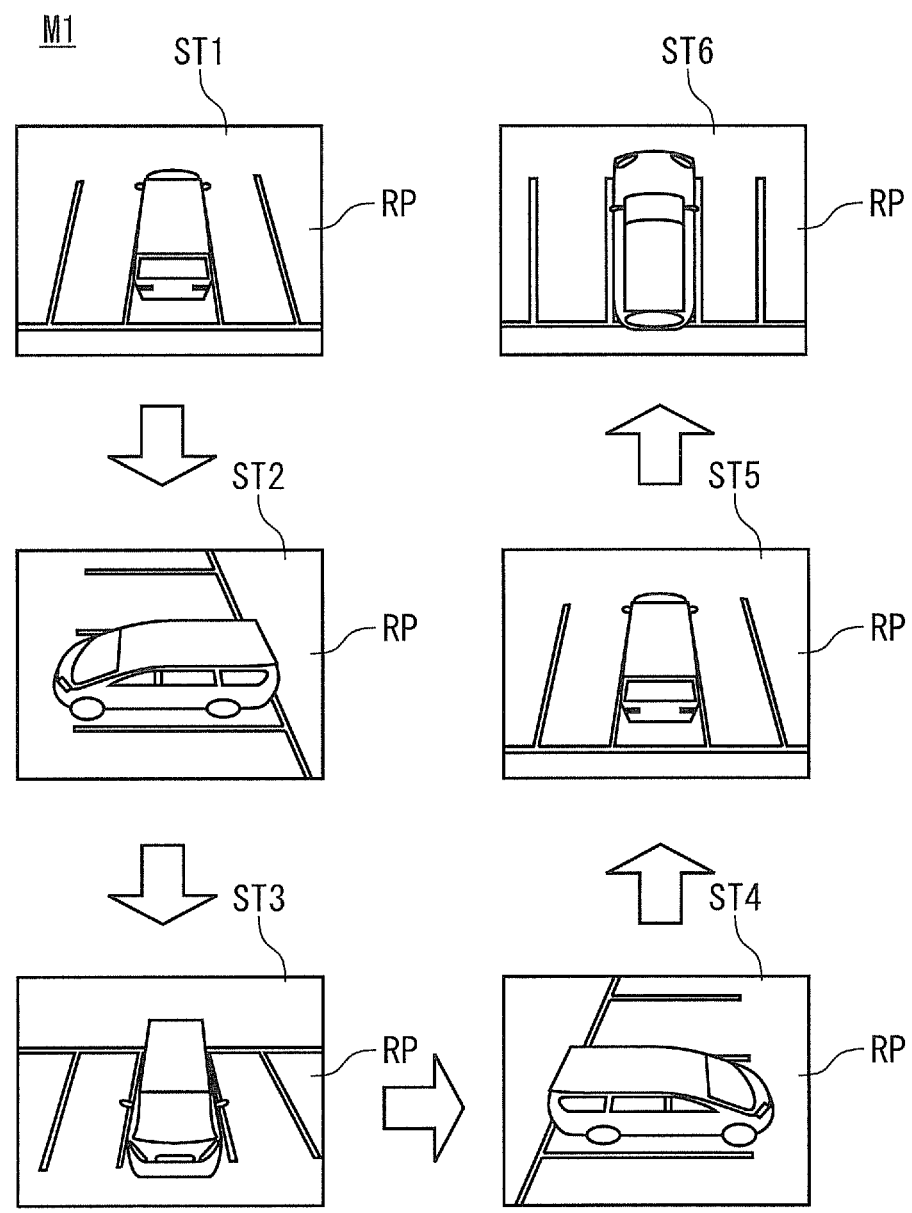
FIG. 12 is a view illustrating display examples in a surrounding confirmation mode.

Because of this, as shown in FIG. 12, animated representation is performed which shows orbiting around the vehicle 9 as viewing the vehicle 9 downward. In an example shown in FIG. 12, the synthetic images RP are displayed sequentially in the order of ST1 to ST6. In each of the synthetic images RP, the vehicle 9 is arranged in the vicinity of the center of the image, and the peripheral mode of the vehicle 9 can be confirmed along with the vehicle 9.

By visually recognizing the animated representation in the surrounding confirmation mode M1, the user can confirm the situation of the whole periphery of the vehicle 9 from the viewpoint in front of the vehicle 9, and intuitively grasp the positional relationship between the obstacles on the whole periphery of the vehicle and the vehicle 9.

<1-6. Front Mode>

Figure 13:
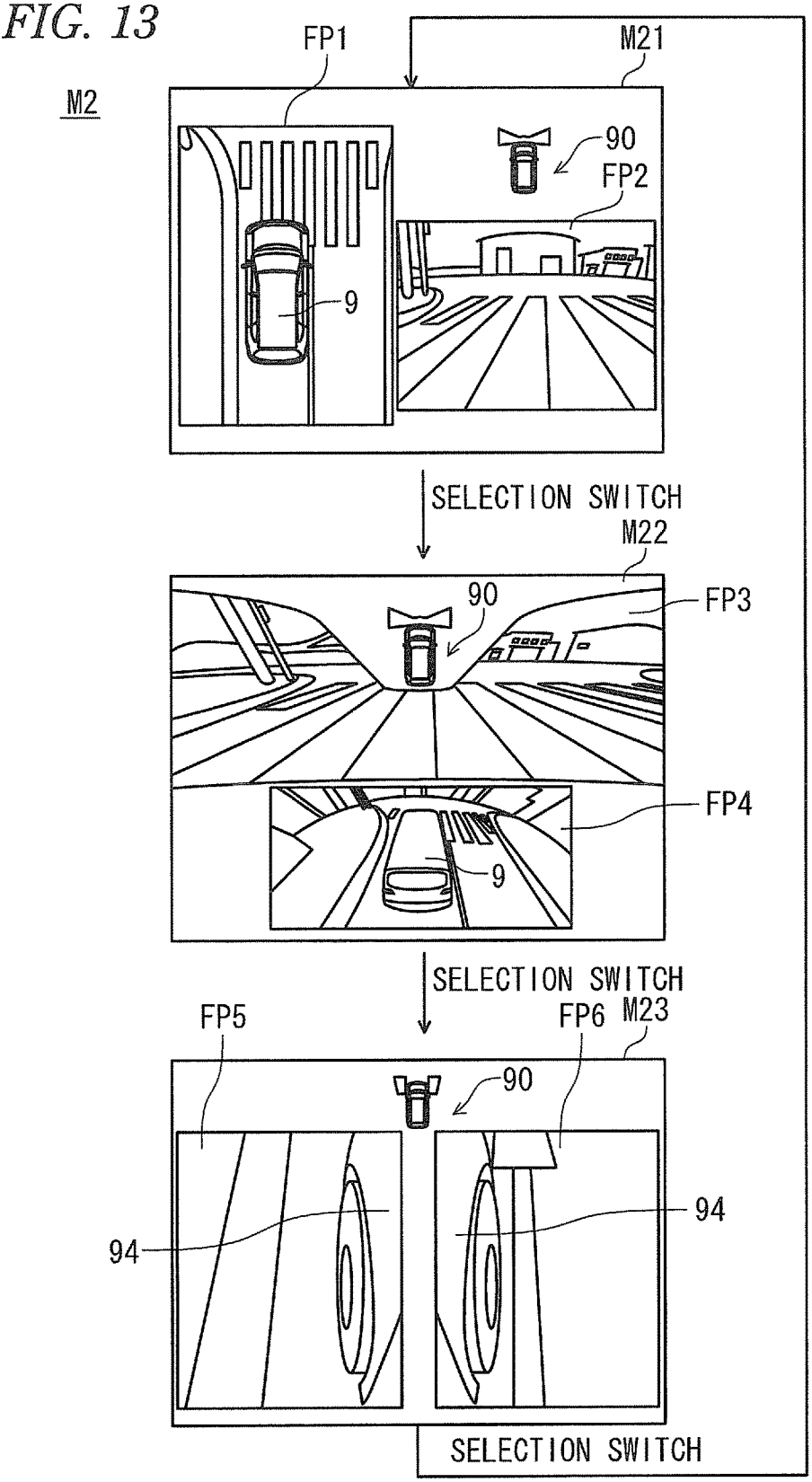
FIG. 13 is a view illustrating a transition of a display mode in a front mode.

Then, the display mode of the periphery of the vehicle 9 in the front mode M2 will be described. FIG. 13 is a view illustrating transition of the display mode in the front mode M2. The front mode M2 includes four display modes of a driving downward view mode M21, a vehicle confirmation mode M22, and a side camera mode M23, and these display modes have different display types. On the screens of these display modes, visual field guides 90 indicating the visual field ranges in the respective display modes are displayed, and indicate which area of the periphery of the vehicle 9 is displayed with respect to the user.

Whenever the user presses the selection switch 43 the driving downward view mode M21, the vehicle confirmation mode M22, and the side camera mode M23 are switched in order under the control of the control unit 1. If the selection switch 43 is pressed in the side camera mode M23, the mode returns again to the driving downward view mode M21.

The driving downward view mode M21 is a display mode for displaying, on the display 21, a screen that contains the synthetic image FP1 showing the appearance of the vehicle 9 viewed from the virtual viewpoint VP directly above the vehicle 9 and the front image FP2 obtained by capturing through the front camera 51 side by side. That is, in the driving downward view mode M21, two images of the synthetic image FP1 showing the whole periphery of the vehicle 9 and the front image FP2 showing the front of the vehicle 9 are displayed on the same screen.

In the driving downward view mode M21, since two images FP1 and FP2 can be read, the user can confirm the situation of the front that is the driving direction of the vehicle 9 together with the whole periphery of the vehicle 9 at a glance. The driving downward view mode M21 may be a display mode that can be used with high versatility on various kinds of scenes during the straight driving.

Further, the vehicle confirmation mode M22 is a display mode for displaying, on the display 21, a screen that contains the front image FP3 obtained by capturing through the front camera 51 and the synthetic image FP4 showing the appearance of the vehicle 9 viewed from the virtual viewpoint VP in the rear of the vehicle 9 side by side. That is, in the vehicle confirmation mode M22, two image of the front image FP3 showing the front of the vehicle 9 and the synthetic image FP4 showing the side of the vehicle 9 are displayed on the same screen.

The front image FP3 in the vehicle confirmation mode M22 has a wide viewing range in left and right directions in comparison to the front image FP2 in the driving downward view mode M21. Because of this, objects, which are present in front of the front end of the vehicle 9 that easily becomes a blind spot when the vehicle enters into an intersection with poor visibility and in the left and right directions, can be confirmed.

Further, according to the synthetic image FP4 in the vehicle confirmation mode M22, since the position of the virtual viewpoint VP is moved to the rear of the vehicle 9 in comparison to the synthetic image FP1 in the driving downward view mode M21, the area showing the rear of the vehicle 9 becomes narrowed, but it is easy to confirm the side of the vehicle 9. Due to this, when oncoming vehicles pass each other, the clearance between the oncoming vehicles can be easily confirmed.

Since two images FP3 and FP4 can be read in the vehicle confirmation mode M22, the user can confirm the situation of the area to be confirmed at a glance in satiations that require careful driving, such as in the case where the vehicle enters into the intersection with poor visibility or the oncoming vehicles pass each other.

Further, the side camera mode M23 is a display mode for displaying, on the display 21, a screen that contains side images FP5 and FP6 obtained by capturing through left and right side cameras 53 side by side. The side images FP5 and FP6 show only the outer side of the front fender 94 that easily becomes a blind spot from the driver's seat.

Since two images FP3 and FP4 can be read in the side camera mode M23, the user can easily confirm the situation of the area to be confirmed in the case of moving toward the roadside.

<1-7. Back Mode>

Figure 14:
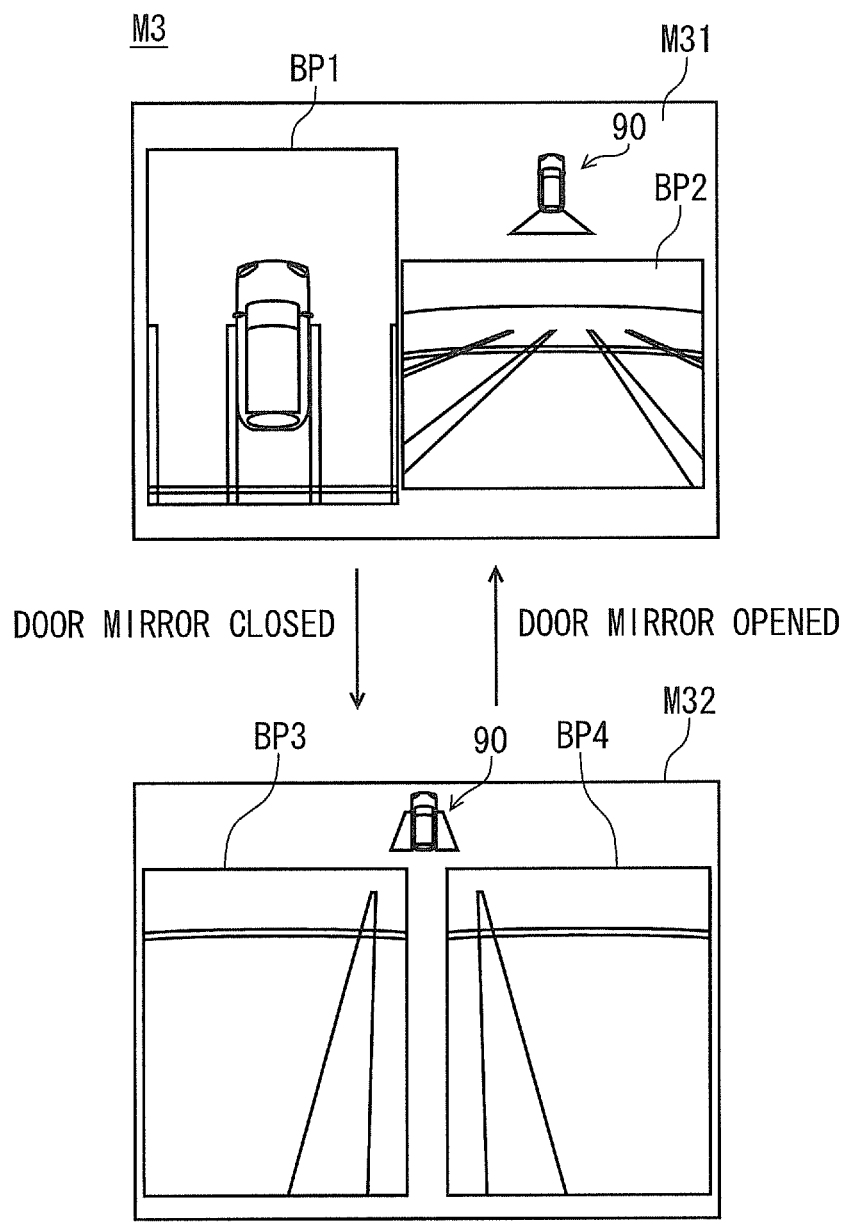
FIG. 14 is a view illustrating a transition of a display mode in a back mode.

Then, the display mode of the periphery of the vehicle 9 in the back mode M3 will be described. FIG. 14 is a view illustrating transition of the display mode in the back mode M3. The back mode M3 includes two display modes of a parking downward view mode M31 and a door mirror mode M32, and these display modes have different display types. On the screens of the display modes, visual field guides 90 indicating the visual field ranges in the respective display modes are displayed, and indicate which area of the periphery of the vehicle 9 is displayed with respect to the user.

These display modes are switched under the control of the control unit 1 depending on the state of the door mirror 93 that is input from the mirror driving device 86. Specifically, if the door mirror 93 is opened to be in a typical state, the display mode becomes the parking downward view mode M31, while if the door mirror 93 is closed, the display mode becomes the door mirror mode M32.

The parking downward view mode M31 is a display mode for displaying, on the display 21, a screen that contains the synthetic image BP1 showing the appearance of the vehicle 9 viewed from the virtual viewpoint VP directly above the vehicle 9 and the back image BP2 obtained by capturing through the back camera 52 side by side. That is, in the parking downward view mode M31, two images of the synthetic image BP1 showing the whole periphery of the vehicle 9 and the back image BP2 showing the rear of the vehicle 9 are displayed on the same screen.

In the parking downward view mode M31, since two images BP1 and BP2 can be read, the user can confirm the situation of the rear that is the driving direction of the vehicle 9 together with the whole periphery of the vehicle 9 at a glance. The parking downward view mode M31 may be a display mode that can be used with high versatility on various kinds of scenes during the rearward movement of the vehicle 9.

Further, the door minor mode M32 is a display mode for displaying, on the display 21, a screen that contains side images BP3 and BP4 obtained by capturing through the left and right side cameras 53 side by side. The side images BP3 and BP4 show almost the same range as the range that is reflected in the door minor, specifically, the rear of the side area of the vehicle 9, when the door mirror 93 is opened.

Figure 15:
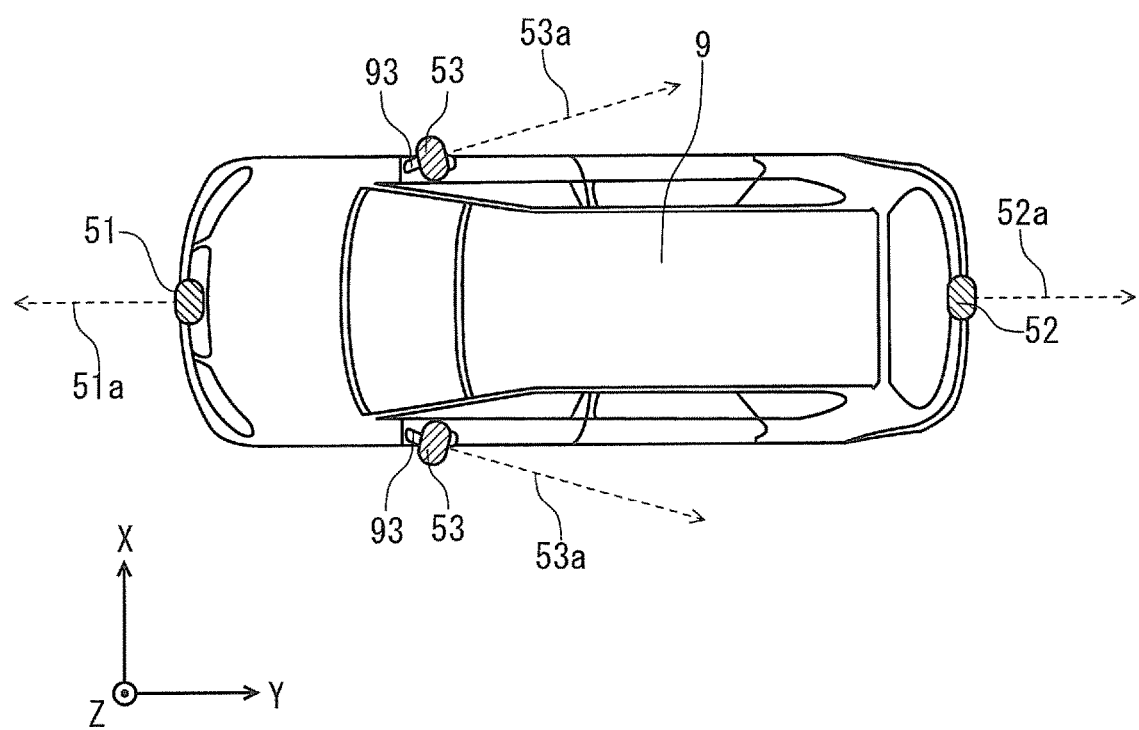
FIG. 15 is a view illustrating a state where a door mirror is closed.

As shown in FIG. 15, the side cameras 53 are provided on the door minors 93, and if the door minors 93 are in a closed state, the direction of the optical axis 53a s directed toward the rear of the vehicle 9. In this state, it is not possible to acquire the image showing the whole side of the vehicle 9 through the side cameras 53, and it is difficult to generate synthetic images from certain virtual viewpoints. However, since the optical axis 53a is moved toward the rear of the vehicle 9, captured images having relatively low distortion can be acquired with respect to the rear of the side area of the vehicle 9. In the door mirror mode M32, two images BP3, and BP4 showing the rear of the side area of the vehicle 9 are generated and displayed using the captured images acquired by the side cameras 53.

Since the two images BP3, and BP4, can be read in the door minor mode M32, the user can confirm almost the same range as the range that is reflected in the door mirror 93 even in a state where the door minor should be closed due to the parking environment.

<1-8. Selection of Light Sources>

In the above-described image displaying system 120, if the appearance of the periphery of the vehicle 9 is shown on the display 21 in various kinds of display modes and sufficient brightness of the image showing the periphery of the vehicle 9 is not ensured due to relatively dark surrounding environment, the illumination is performed through the auxiliary illuminating unit 6.

However, if all the light sources 60 of the auxiliary illuminating unit 6 are activated in the same way, unnecessary power consumption may occur. For example, since only the outer side of the front fender 94 is shown in the side camera mode M23, a necessary image can be acquired through illumination of only the center area CA illustrated in FIG. 6, and the need to illuminate the front area FA or the rear area BA is low.

Because of this, in the image displaying system 120, the illumination control unit 12 selects the light sources 60 to be activated among the light sources of the auxiliary illuminating unit 6 depending on the display mode at that time, and activates only the selected light sources 60. Through this, the light sources 60 is selected according to the area of the periphery of the vehicle 9 that is displayed on the display 21 at that time, and only the area required to display is mainly illuminated.

The correspondence relationship between such a display mode and the light source 60 selected by the illumination control unit 12 is predetermined and is shown in the illumination table 4b stored in the nonvolatile memory 40.

FIG. 16 is a diagram showing the contents of the illumination table 4b. As shown in the drawing, in the illumination table 4b, which of the front light source 61, the center light source 63, and the rear light source 62 is to be illuminated is described for each display mode. In the illumination table 4b, the light source 60 to be activated is indicated as "ON", and the light source 60 to be inactivated is indicated as "OFF".

In the surrounding confirmation mode M1, the front light source 61, the center light source 63, and the rear light source 62 are all shown as the light sources 60 to be activated. Since the surrounding confirmation mode M1 is a display mode for confirming the situation of the whole periphery of the vehicle 9, it is preferable to illuminate a range as wide as possible. Accordingly, all the light sources 60 are selected as the light sources 60 to be activated.

In the driving downward view mode M21, the front light source 61, the center light source 63, and the rear light source 62 are all shown as the light sources 60 to be activated. Since the synthetic image FP1 showing the whole periphery of the vehicle 9 is shown in the driving downward view mode M21, it is preferable to illuminate a range as wide as possible. Accordingly, all the light sources 60 are selected as the light sources 60 to be activated.

In the vehicle confirmation mode M22, the front light source 61 and the center light source 63 are shown as the light sources 60 to be activated. The vehicle confirmation mode M22 is used when the vehicle enters into an intersection with poor visibility or when oncoming vehicles pass each other. Because of this, in order to call a user's attention to the front side of the vehicle 9 that the driver should note, only the front light source 61 and the center light source 63 are selected as the light sources 60 to be activated, and the rear light source 62 is not selected.

In the side camera mode M23, only the center light source 63 is selected as the light source 60 to be activated. Since only the outside of the front fender 94 is shown in the side camera mode M23, only the center light source 63 is selected as the light source 60 to be activated, and the front light source 61 and the rear light source 62 are not selected.

In the parking downward view mode M31, the front light source 61, the center light source 63, and the rear light source 62 are all shown as the light sources 60 to be activated. Since the synthetic image FP1 showing the whole periphery of the vehicle 9 is shown in the parking downward view mode M31, it is preferable to illuminate a range as wide as possible. Accordingly, all the light sources 60 are selected as the light sources 60 to be activated.

Further, in the door mirror mode M32, only the center light source 63 is shown as the light source 60 to be activated. In the door mirror mode M32, the rear of the side area of the vehicle 9 is shown. However, in this case, the door mirror 93 is closed, and thus the directions of the light axes of the three light sources 60 are moved to the rear side of the vehicle 9. Because of this, only the center light source 63, of which the light axis is directed to the rear of the side area of the vehicle 9, is selected as the light source 60 to be activated, and the front light source 61 and the rear light source 62 are not selected.

<1-9. Processing Flow>

Figure 17:
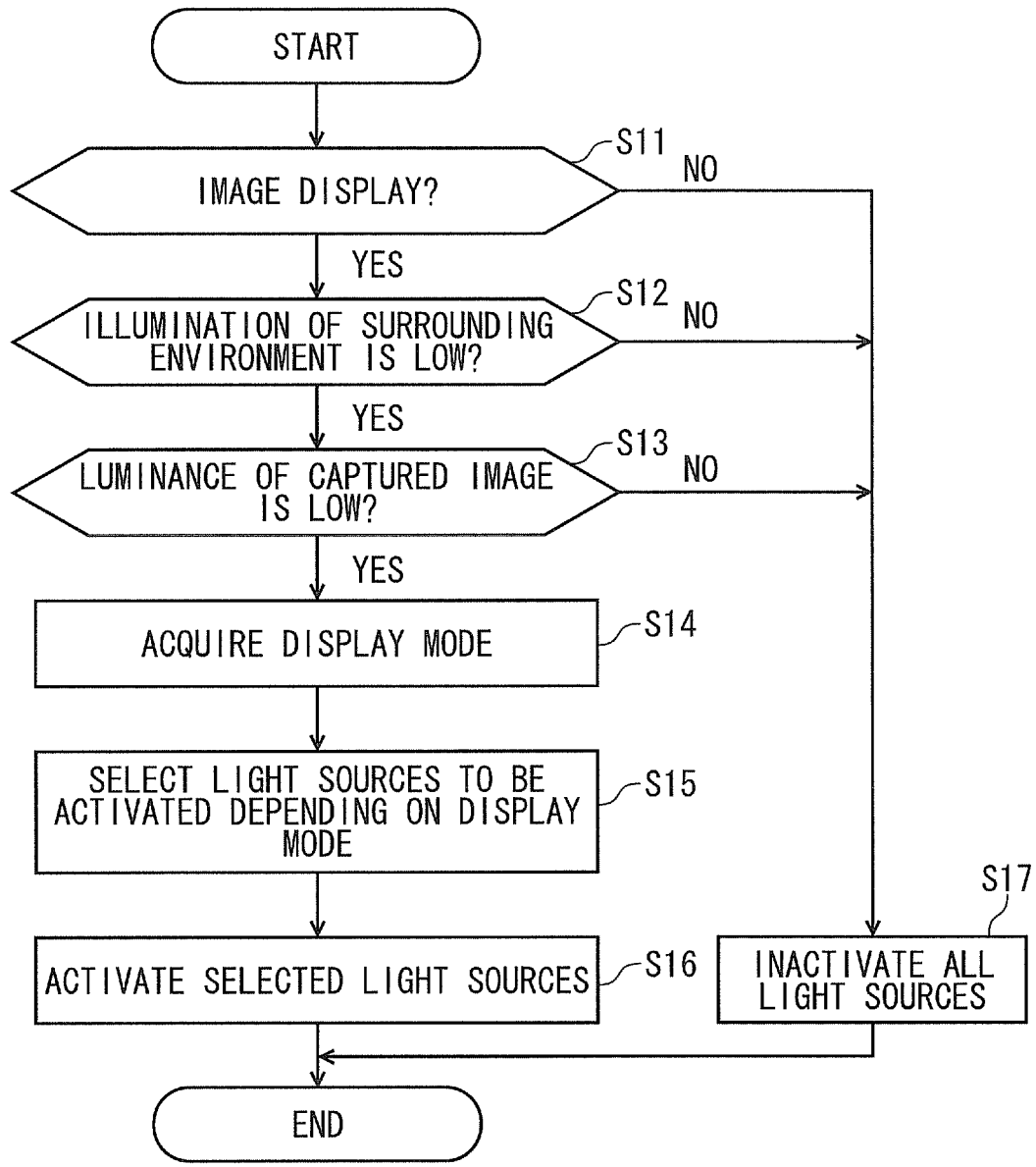
FIG. 17 is a diagram illustrating a processing flow for selecting light sources according to a first embodiment.

Then, a processing flow for selecting the light sources 60 to be activated as described above will be described. FIG. 17 is a diagram illustrating a processing flow for selecting the light sources 60 to be activated by the illumination control unit 12. This processing is repeatedly performed by the illumination control unit 12.

First, it is determined whether the present state is a state where the image of the periphery of the vehicle 9 is displayed on the display 21 (step S11). Specifically, it is determined whether the current operating mode is an operating mode except for a navigation mode M0 (if the operating mode is the surrounding confirmation mode M1, the front mode M2, or the back mode M3). If the operating mode is the navigation mode M0 ("No" in step S11), the illumination by the auxiliary illuminating unit 6 is unnecessary, and thus all the light sources are inactivated (step S17).

Further, if the operating mode is other than the navigation mode M0 ("Yes" in step S11), it is determined whether the surrounding environment is dark to the extent that the illumination by the auxiliary illuminating unit 6 is necessary (step S 12). Specifically, it is determined whether the illumination showing the brightness of the surrounding environment of the vehicle 9 that is input from the illumination sensor 83 is lower than a predetermined threshold value. If the illumination from the illumination sensor 83 is higher than the predetermined threshold value ("No" in step S12), the illumination by the auxiliary illuminating unit 6 is unnecessary, and thus all the light sources are inactivated (step S17).

Further, if the illumination from the illumination sensor 83 is lower than the predetermined threshold value ("Yes" in step S12), it is determined whether the brightness of the captured image actually acquired by the image capturing unit 5 is dark to the extent that the illumination by the auxiliary illuminating unit 6 is necessary (step S13). Specifically, an average luminance of the captured image from the captured image adjustment unit 31 is input to the control unit 1, and it is determined whether the average luminance of the captured image is lower than the predetermined threshold value. If the average luminance of the captured image is higher than the predetermined threshold value ("No" in step S13), the illumination by the auxiliary illuminating unit 6 is unnecessary, and thus all the light sources are inactivated (step S17).

On the other hand, if the average luminance of the captured image is lower than the predetermined threshold value ("Yes" in step S13), the display mode at that time is acquired (step S14). Then, the illumination table 4b stored in the nonvolatile memory 40 is referred to, and the light sources 60 to be activated are selected depending on the display mode (step S15).

Then, a signal is output from the illumination control unit 12 to the auxiliary illuminating unit 6 so that the selected light sources 60 are activated. Accordingly, only the selected light sources 60 are activated depending on the display mode (step S16).

As described above, in this embodiment, since the light sources 60 in the auxiliary illuminating unit 6 can be selectively activated, unnecessary light sources 60 are not activated, and thus the power consumption can be reduced. Further, since the light sources 60 to be activated are selected depending on the area that is displayed on the display 21, only the area that is required for display is illuminated, and thus the power consumption can be efficiently reduced.

<2. Second Embodiment>

Then, a second embodiment will be described. Since the configuration and processing of the image displaying system according to the second embodiment are almost the same as those according to the first embodiment, but only a part thereof differs from that according to the first embodiment, the differences between the embodiments will be described hereinafter.

In the vehicle confirmation mode M22 according to the second embodiment, in response to the driver's operation of a turn signal switch of a direction indicator 85, the viewpoint position of the virtual viewpoint VP of the synthetic image FP4 is moved.

Figure 18:
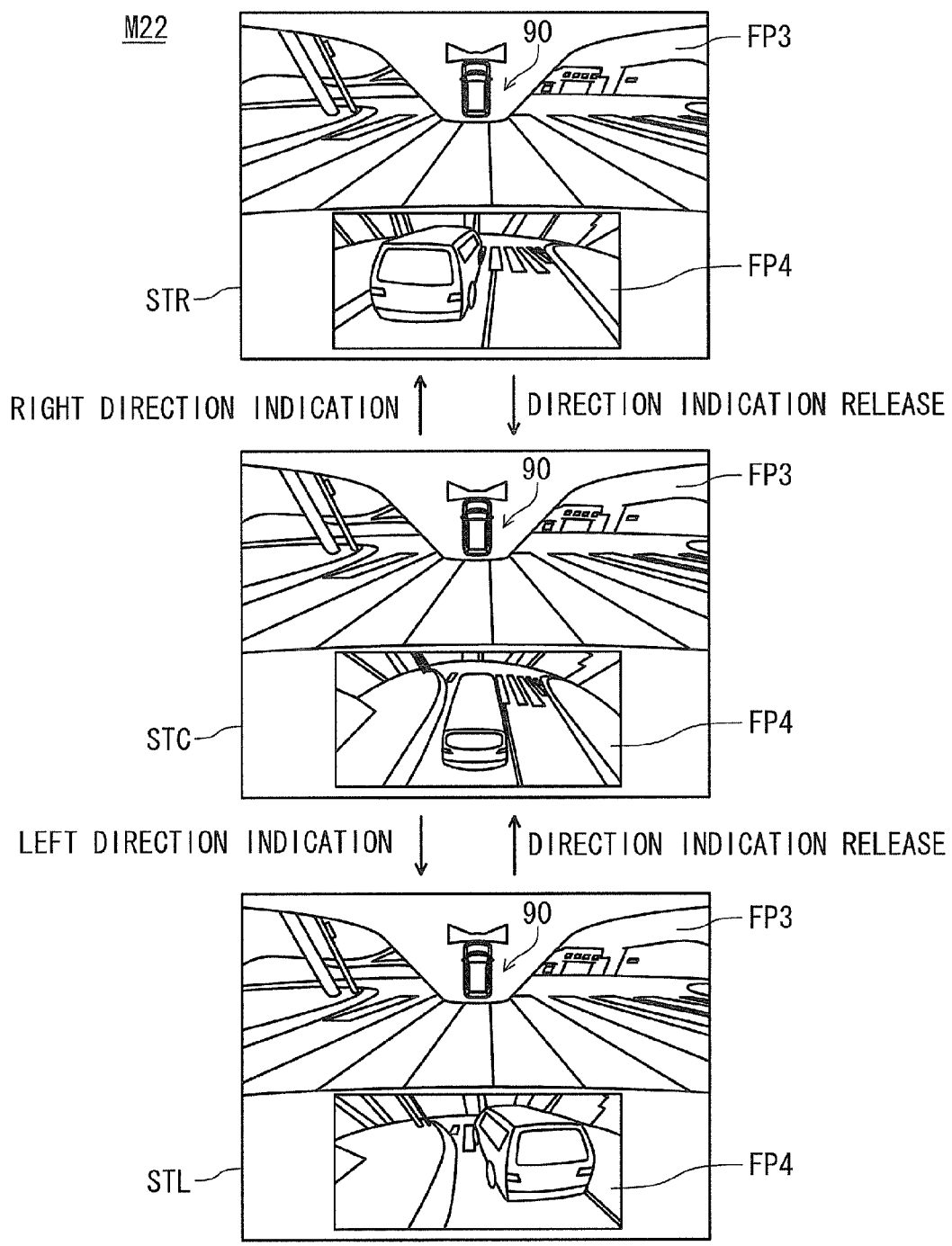
FIG. 18 is a view illustrating a state transition of a screen in a vehicle confirmation mode.
Figure 19:
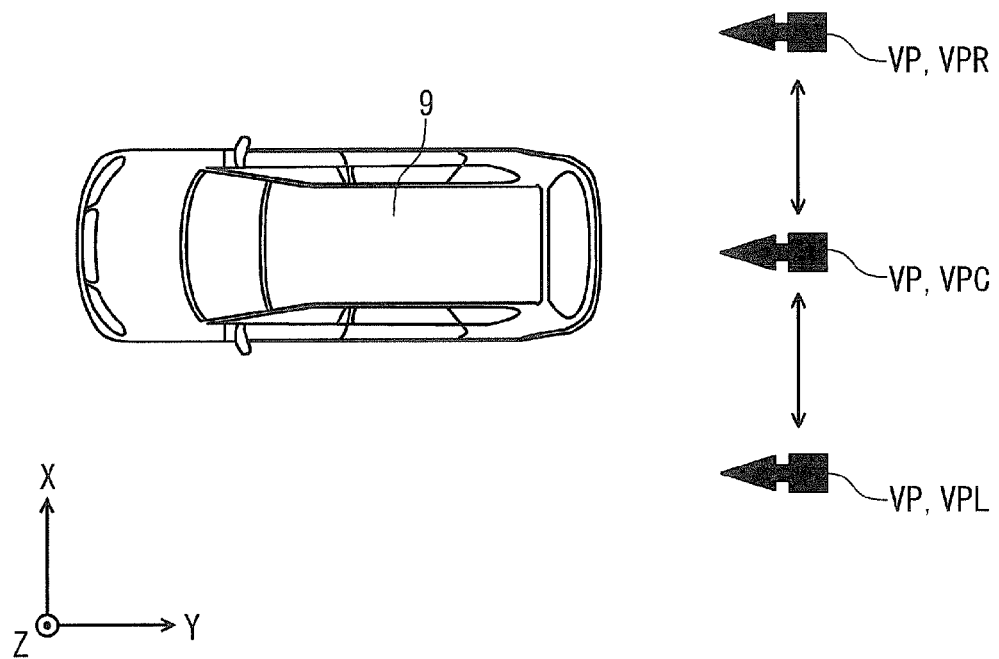
FIG. 19 is a view illustrating a transition of positions of virtual viewpoints.

FIG. 18 is a view illustrating a state transition of a screen in a vehicle confirmation mode, and FIG. 19 is a view illustrating a transition of positions of virtual viewpoints. If the turn signal input from the direction indicator 85 is in an off state, that is, if there is no direction indication, the viewpoint position of the virtual viewpoint VP is substantially the center VPC of the left and right sides in the rear of the vehicle 9 (see FIG. 19), and the direction of the visual field is set to the forward direction of the vehicle 9. Through this, as shown as the stat STC in FIG. 18, a synthetic image FP4 that substantially uniformly includes the side area of both the left and right sides of the vehicle 9 is displayed on the display 21.

On the other hand, if the turn signal input from the direction indicator 85 is in an on state, that is, if there is a direction indication, the direction of the visual field with respect to the virtual viewpoint VP is in the forward direction, and the viewpoint position is moved to the position in the direction indicated by the turn signal.

Specifically, if the turn signal indicates the left direction, the viewpoint position of the virtual viewpoint VP is set to the position VPL of the left side of the vehicle 9 (see FIG. 19). Through this, as shown as the state STL in FIG. 18, the synthetic image FP4, in which the side area in the left direction, that is indicated by the turn signal of the direction indicator 85, is shown to be larger than the side area in the right direction, is displayed on the display 21.

Further, if the turn signal indicates the right direction, the viewpoint position of the virtual viewpoint VP is set to the position VPR of the right side of the vehicle 9 (see FIG. 19). Through this, as shown as the state STR in FIG. 18, the synthetic image FP4, in which the side area in the right direction, that is indicated by the turn signal of the direction indicator 85, is shown to be larger than the side area in the left direction, is displayed on the display 21.

There is a high possibility that in the direction indicated by the direction indicator 85, the vehicle 9 moves to and makes contact with an object in the case of performing direction change or moving toward the roadside. Accordingly, by showing the large-sized side area in the direction indicated by the direction indicator 85, the attention of the user (representatively, the driver) can be drawn to an object that might make contact with the vehicle 9, and thus the contact of the vehicle 9 with the object can be efficiently prevented. On the other hand, if the direction indication is released, as shown as the state STC in FIG. 18, the display returns to the state where the synthetic image FP4 that substantially uniformly includes the side area of both the left and right sides of the vehicle 9 is displayed.

Further, in the second embodiment, if there is such a direction indication, the light sources 60 to be activated is selected among the three light sources 60 that are accommodated in the housing 7 arranged in the direction indicated by the direction indication.

Figure 20:
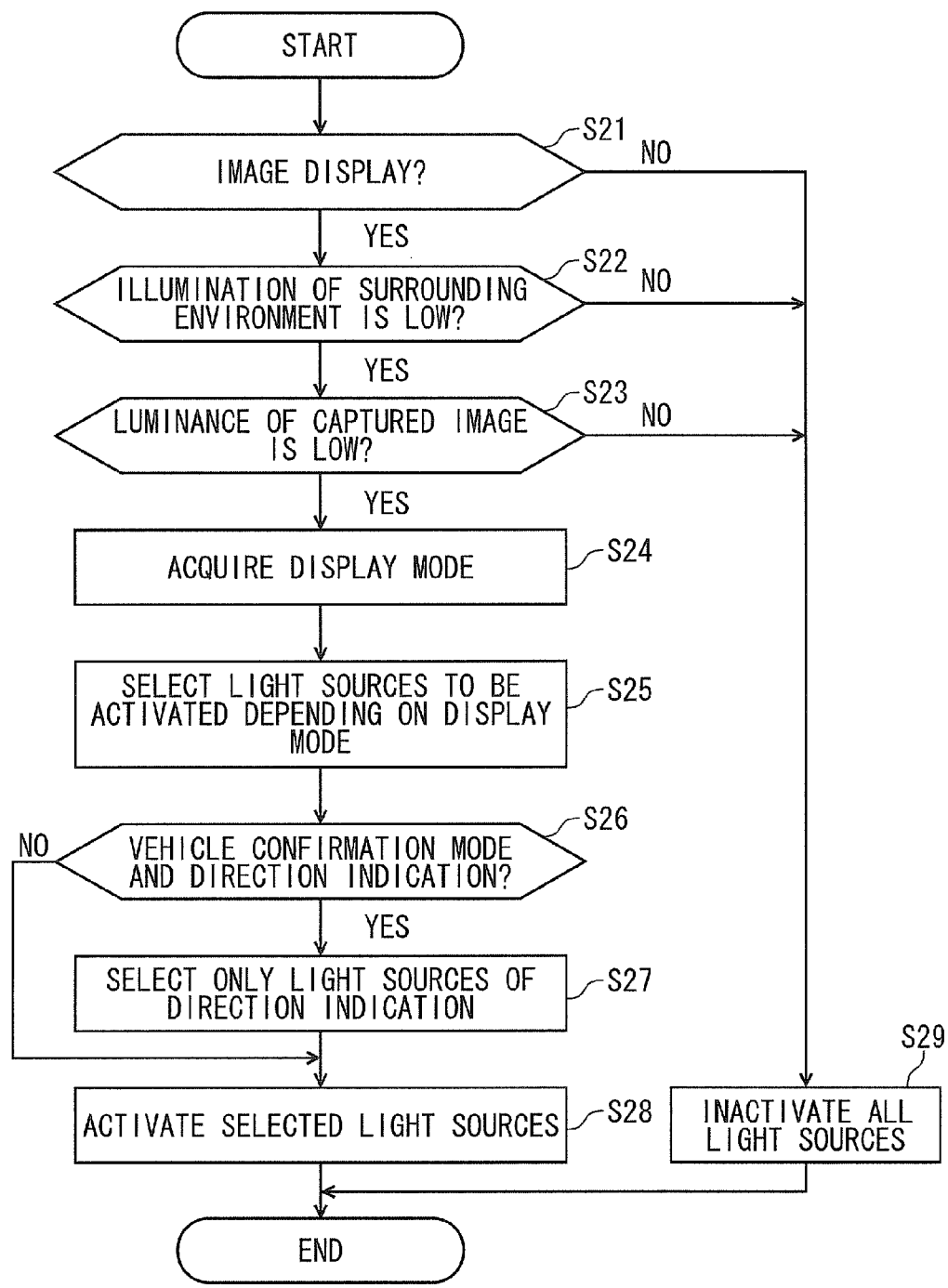
FIG. 20 is a diagram illustrating a processing flow for selecting light sources according to a second embodiment.

FIG. 20 is a diagram illustrating a processing flow for selecting light sources 60 to be activated by the illumination control unit 12 according to a second embodiment.

The processing in steps S21 to S25 and S29 shown in FIG. 20 is the same as the processing in steps S11 to S15 and S17 shown in FIG. 19. Accordingly, at a time of the completion of the step S25, the light sources 60 to be activated is selected depending on the display mode.

If the step S25 is completed, it is determined whether the display mode is the vehicle confirmation mode M22 and whether there is the direction indication (step S26). The presence of the direction indication is determined based on the turn signal. If the display mode is the vehicle confirmation mode M22 or if there is no direction indication ("No" in step S26) even in the vehicle confirmation mode M22, the light sources 60 selected in step S25 are controlled to be activated (step S28).

On the other hand, if the display mode is the vehicle confirmation mode M22 and there is the direction indication ("Yes" in step S26), only the light sources 60 arranged in the direction indicated by the direction indication are selected among the light sources 60 selected in step S25, and the selection of the light sources 60 arranged in an opposite direction to the direction indication is released (step S27). Further, only the light sources 60 arranged in the direction indicated by the direction indication are controlled to be activated (step S28).

By activating only the light sources 60 arranged in the direction indicated by the direction indication as described above, the attention of the user (representatively, the driver) can be drawn to the side area in the direction indicated by the direction indicator 85.

On the other hand, in the second embodiment, the light sources 60 to be activated are selected based on the direction indicated by the direction indication only in the case of the vehicle confirmation mode M22. However, even in other display modes, only the light sources 60 arranged in the direction indicated by the direction indication may be activated in the same manner.

<3. Third Embodiment>

Then, a third embodiment will be described. Since the configuration and processing of the image displaying system according to the third embodiment are almost the same as those according to the first embodiment, but only a part thereof differs from that according to the first embodiment, the differences between the embodiments will be described hereinafter.

The three light sources 60 arranged in one side camera unit 70, as shown in FIG. 6, illuminate the front area FA, the center area CA, and the rear area BA. Among them, it is possible to illuminate the front area FA through the headlights provided in the vehicle 9 as the standard.

Figure 21:
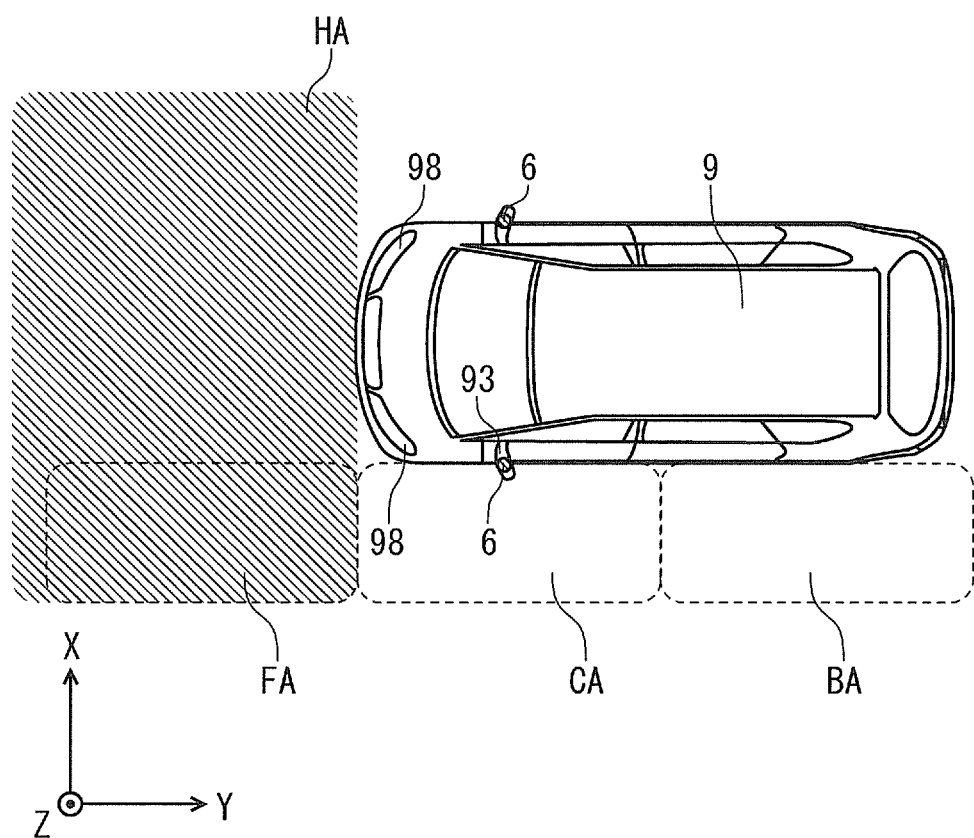
FIG. 21 is a view illustrating an area that can be illuminated by vehicle headlights.

FIG. 21 is a view illustrating an area that can be illuminated by the headlights 98 of the vehicle 9. In the drawing, an area HA, which can be illuminated to the extent that an image with sufficient brightness (for example, 0.5 lux or more) can be acquired by the headlights 98, is indicated as hatched area. Accordingly, in the case where the headlights 98 are activated, the need to illuminate the front area is low. Accordingly, in the third embodiment, if the headlights 98 are activated, the front light source 61 is not selected as the light source 60 to be activated.

Figure 22:
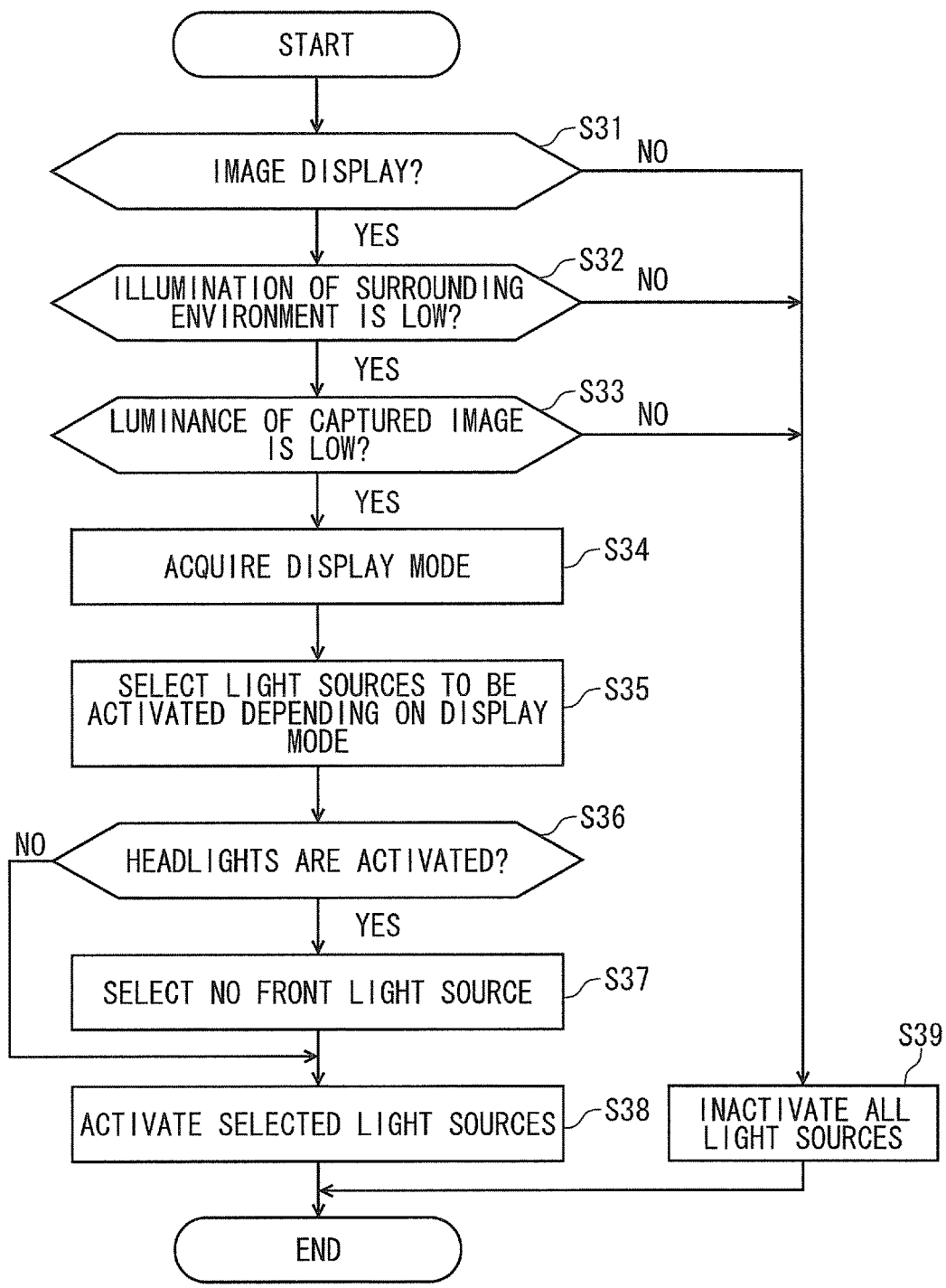
FIG. 22 is a diagram illustrating a processing flow for selecting light sources according to a third embodiment.

FIG. 22 is a diagram illustrating a processing flow for selecting the light sources 60 to be activated by the illumination control unit 12 according to the third embodiment.

The processing in steps S31 to S35 shown in FIG. 22 is the same as the processing in steps S11 to S15 shown in FIG. 19. Accordingly, at a time of the completion of the step S35, the light sources 60 to be activated is selected depending on the display mode.

If the step S35 is completed, it is determined whether the headlights 98 are activated (step S36). The activation state of the headlights 98 is determined based on the signal from the lightening control device 84. If the headlights 98 are inactivated ("No" in step S36), the light sources 60 selected in step S35 are controlled to be activated (step S38).

On the other hand, if the headlights 98 are activated, the light sources 60 except for the front light source 61 are selected among the light sources 60 selected in step S35, and the selection of the front light source 61 is released (step S37). Then, only the selected light sources 60 except for the front light source 61 are controlled to be activated (step S38).

As described above, since the area that is illuminated by the headlights 98 is not further illuminated, unnecessary illumination is not performed, and thus the power consumption can be efficiently reduced. In the third embodiment, only the lightening state of the headlights 98 is considered among the driving lightening devices. However, the light sources 60 to be activated may be selected in consideration of the activation state of other driving lightening devices such as tail lamps, brake lamps, and the like.

<4. Modified Examples>

Although the embodiments of the present invention have been described, the present invention is not limited to the described embodiments, and various modifications may be made. Hereinafter, such modified examples will be described. All forms including the forms described in the above-described embodiments and forms to be described hereinafter may be appropriately combined.

For example, as a condition for selecting the light sources 60 to be activated, the vehicle driving states, such as shift position and the driving speed, may be considered. For example, it is considered that if the shift position is "D (Drive)", the front light source 61 is selected as the light source 60 to be activated, and if the shift position is "R (Reverse)", the rear light source 62 is selected as the light source 60 to be activated. Further, if the driving speed is equal to or higher than a predetermined speed, only the front light source 61 is selected as the light source 60 to be activated in order to make the driver concentrate on the driving direction, while if the driving speed is lower than the predetermined speed, the confirmation of the periphery of the vehicle may be required, and it is considered to select all the light sources 60 as the light sources 60 to be activated.

In the above-described embodiment, the image processing device 100 and the navigation device 20 are provided as devices different from each other. However, the image processing device 100 and the navigation device 20 may be configured as an integrated device that is arranged in the same case.

Further, in the above-described embodiment, the display device that displays the image generated by the image processing device 100 is the navigation device 20. However, the display device may be a general display device that does not have any special function such as the navigation function.

Further, in the above-described embodiment, a part of the function that is realized by the control unit 1 of the image processing device 100 may be realized by the control unit 23 of the navigation device 20.

Further, in the above-described embodiment, a part or all of the signals that are input to the control unit 1 of the image processing device 100 through the signal input unit 41 may be input to the navigation device 20. In this case, it is preferable that the signals are input to the control unit 1 of the image processing device 100 through the navigation communication unit 42.

Further, in the above-described embodiment, the direction indication that is intended by the driver of the vehicle 9 is input from the direction indicator 83. However, the direction indication may be input by another means. For example, the movement of the deriver's viewpoint may be detected from the image of the driver's eye and the direction indication that is intended by the driver may be input depending on the detection result.

Further, in the above-described embodiment, various kinds of functions are realized by software through the arithmetic operation of the CPU according the program. However, a part of these functions may be realized by an electrical hardware circuit. By contrast, a part of the functions that are realized by the hardware circuit may be realized by software.

Priority is claimed on Japanese Patent Application No. 2009-260699 filed in the Japan Patent Office on Nov. 16, 2009, the contents of which are incorporated herein by reference.

DESCRIPTION OF REFERENCE NUMERALS

1: control unit
12: illumination control unit
21: display
3: image generating unit
32: synthetic image generating unit
4*b*: illumination table
53: side camera
6: auxiliary illuminating unit
61: front light source
62: rear light source
63: center light source
7: housing
70: side camera unit
93: door mirror

The invention claimed is:

1. A vehicle illuminating apparatus that is configured to be mounted on a vehicle and that performs an illumination to assist in taking a plurality of images of the periphery of the vehicle, by a plurality of cameras of an image generating apparatus that generates a synthetic image viewed from a virtual viewpoint based on the images, the vehicle illuminating apparatus comprising:
   a plurality of light sources that illuminates a right or left side area of the vehicle;
   a housing in which the light sources are fixed and accommodated in a state where light axes of the light sources are directed to different directions from each other; and
   a controller that selectively activates and deactivates the light sources,
   wherein the plurality of light sources illuminating the right or left side area of the vehicle includes:
      a first light source that illuminates a front area disposed at a front side of the vehicle;
      a second light source that illuminates a rear area disposed at a rear side of the vehicle; and
      a third light source that illuminates an intermediate area disposed between the front area and the rear area,
   wherein the housing, which includes the first light source, the second light source and the third light source, is configured to be attached to a right or left side of the vehicle,
   wherein the first light source, the second light source and the third light source are integrally accommodated in the housing, and the third light source is arranged at a center portion of the housing, wherein the first, second and third light sources are separate light sources, wherein a direction of a light axis of the first light source is inclined to the front side of the vehicle, a direction of a light axis of the second light source is inclined to the rear side of the vehicle, and a direction of a light axis of the third light source is inclined to a direction different from the front side and the rear side of the vehicle, and wherein the controller deactivates all of the light sources when an average luminance of the images captured by the plurality of cameras is higher than a predetermined threshold value, and selectively activates and one or more of the light sources when an average luminance of the images captured by the plurality of cameras is lower than a predetermined threshold value.

2. The vehicle illuminating apparatus as set forth in claim 1, wherein the direction of the light axis of the first light source and the direction of the light axis of the second light source are symmetrical with respect to the direction of a light axis of the third light source.

3. The vehicle illuminating apparatus as set forth in claim 1, further comprising light source driving means for reducing an amount of light of the third light source to less than an amount of light of the first light source and an amount of light of the second light source.

4. The vehicle illuminating apparatus as set forth claim 1, wherein among the cameras, a camera that takes an image of the right or left side area of the vehicle is accommodated in the housing.

5. The vehicle illuminating apparatus as set forth in claim 1, wherein the image generating apparatus outputs an output image showing at least a partial area of the periphery of the vehicle to a display apparatus, wherein the display apparatus displays the output image and has a plurality of display modes, each of the plurality of display modes having a different type of display with respect to an area shown in the image to be displayed in the display apparatus, and wherein the controller selects the one or more of the light sources to be activated based on the type of display corresponding to one of the display modes.

6. The vehicle illuminating apparatus as set forth in claim 1, further comprising input means for inputting a signal indicative of an operating state of a lighting device for driving, used in driving of the vehicle, wherein the controller selects one or more light source to be activated from among the light sources in accordance with the operating state of the lighting device.

7. The vehicle illuminating apparatus as set forth in claim 1, further comprising input means for inputting a direction indication in which a driver of the vehicle intends to turn, wherein the housing is respectively provided at left side and right side of the vehicle, and wherein when the direction indication exists, the controller selects one or more light source to be activated from amount the light sources accommodated in the housing disposed at a side indicated by the direction indication.

8. An image processing apparatus to be mounted on a vehicle, comprising:

an image generating apparatus that generates a synthetic image viewed from a virtual viewpoint based on a plurality of images of a periphery of the vehicle, taken by a plurality of cameras; and the vehicle illuminating apparatus as set forth in claim 1, that performs the illumination to assist in taking the images by the cameras of the image generating apparatus.

9. An image displaying system to be mounted on a vehicle, comprising:

the image processing apparatus as set forth in claim 8; and a display apparatus that displays an image showing the periphery of the vehicle, output from the image processing apparatus.

10. The vehicle illuminating apparatus as set forth in claim 1, wherein the housing is configured to be provided in a door mirror of the vehicle.

11. The vehicle illuminating apparatus as set forth in claim 1, wherein an angle between the light axis of the first light source and the light axis of the third light source coincides with an angle between the light axis of the second light source and the light axis of the third light source, the angle being within a range of 60 to 70 degrees.

12. The vehicle illuminating apparatus as set forth in claim 1, wherein the right side of the vehicle is the side to the right of a driver when the driver is seated in the vehicle and facing a forward direction of travel of the vehicle, and wherein the left side of the vehicle is the side to the left of the driver when the driver is seated in the vehicle and facing the forward direction of travel of the vehicle.

13. The vehicle illuminating apparatus as set forth in claim 12, wherein the right side area of the vehicle is on the right side of the vehicle, and the left side area of the vehicle is on the left side of the vehicle.

* * * * *